United States Patent [19]
Walster et al.

[11] Patent Number: 5,764,974
[45] Date of Patent: Jun. 9, 1998

[54] SYSTEM WITH USER SPECIFIED PATTERN DEFINITIONS FOR MATCHING INPUT MESSAGES AND ASSOCIATED DECISIONS FOR CONDITIONALLY RESPONDING TO THE INPUT MESSAGES

[75] Inventors: James Earl Walster, Roseville; Mark Anthony Wiggins, St. Paul, both of Minn.

[73] Assignee: Unisys Corporation, Blue Bell, Pa.

[21] Appl. No.: 521,003

[22] Filed: Aug. 30, 1995

[51] Int. Cl.[6] .................................................. G06F 17/30
[52] U.S. Cl. .......................... 395/606; 395/603; 395/604; 395/21; 395/54
[58] Field of Search .................................. 395/603, 604, 606, 21, 54

[56] References Cited

U.S. PATENT DOCUMENTS

| | | | |
|---|---|---|---|
| 3,614,328 | 10/1971 | McNaughton et al. | 179/15 AT |
| 4,285,049 | 8/1981 | Bird et al. | 364/900 |
| 4,341,929 | 7/1982 | Alexander et al. | 179/90 B |
| 4,608,460 | 8/1986 | Carter et al. | 179/6.11 |
| 4,791,556 | 12/1988 | Vilkaitis | 364/200 |
| 4,922,519 | 5/1990 | Daudelin | 379/67 |
| 4,979,206 | 12/1990 | Padden et al. | 379/67 |
| 5,163,083 | 11/1992 | Dowden et al. | 379/88 |
| 5,180,309 | 1/1993 | Egnor | 434/323 |
| 5,282,265 | 1/1994 | Rohra Suda et al. | 395/12 |
| 5,315,711 | 5/1994 | Barone et al. | 395/275 |
| 5,379,340 | 1/1995 | Overend et al. | 379/93 |
| 5,418,943 | 5/1995 | Borgida et al. | 395/600 |
| 5,485,531 | 1/1996 | Ichinohe et al. | 382/198 |
| 5,576,951 | 11/1996 | Lockwood | 395/227 |
| 5,627,940 | 5/1997 | Rohra et al. | 395/12 |

Primary Examiner—Thomas G. Black
Assistant Examiner—Jean R. Homere
Attorney, Agent, or Firm—Charles A. Johnson; Mark T. Starr

[57] ABSTRACT

A system for automatically and variably responding to character-based messages is disclosed. With user specified input, a software tool creates a pattern database. The pattern database consists of pattern definitions for matching input messages and response definitions for automatically responding to matching input messages. Pattern definitions define criteria for matching an input message. The response definitions include function definitions and optional function decisions. Functions to be performed in response to a matching message are specified in the function definitions, wherein performance of the specified functions is dependent upon evaluation of the function decisions.

22 Claims, 20 Drawing Sheets

Example input for
Pattern Database

```
DEFINE VARIABLE GROUP "Cache_Error_Count"
   TYPE INTEGER
   DEFAULT -1
   TIMEOUT 10 MINUTES
END DEFINE VARIABLE "Response"
END DEFINE VARIABLE "Device"
END
```
⎫
⎬ 110
⎭

```
DEFINE "ANSWER"
   MESSAGE "device-name path CACHE-ERR io-function run-id/EXEC 8 AGM"
   TYPE PRIVILEGED-EXEC READ-AND-REPLY VARIABLE-LENGTH
   TOKEN KEYWORD 3 "CACHE-ERR"
```
⎫ 102
⎬
⎭

`CONSTRAINT _NEGTOKEN1 = "AGM"` ⎬ 112

```
   SET Device = "\_TOKEN1\"
   SET Cache_Error_Count:Device = Cache_Error_Count:Device + 1
   IF Cache_Error_Count:Device = 0
```
108

`SET Response = "M"` ⎬ 108

ELSEIF Cache_Error_Count:Device < 4

`SET Response = "A"` ⎬ 108    ⎬ 106    ⎬ 104

ELSE
      `SET Response = "G"`
      `DESTROY Cache_Error_Count:Device` ⎬ 108
   ENDIF `ACTION ALL RESPONSE "\Response\"` ⎬ 108
END

FIG. 4

102 = Pattern definition
104 = Response definition
106 = Function decision
108 = Function definitions
110 = Data structures
112 = Pattern decision

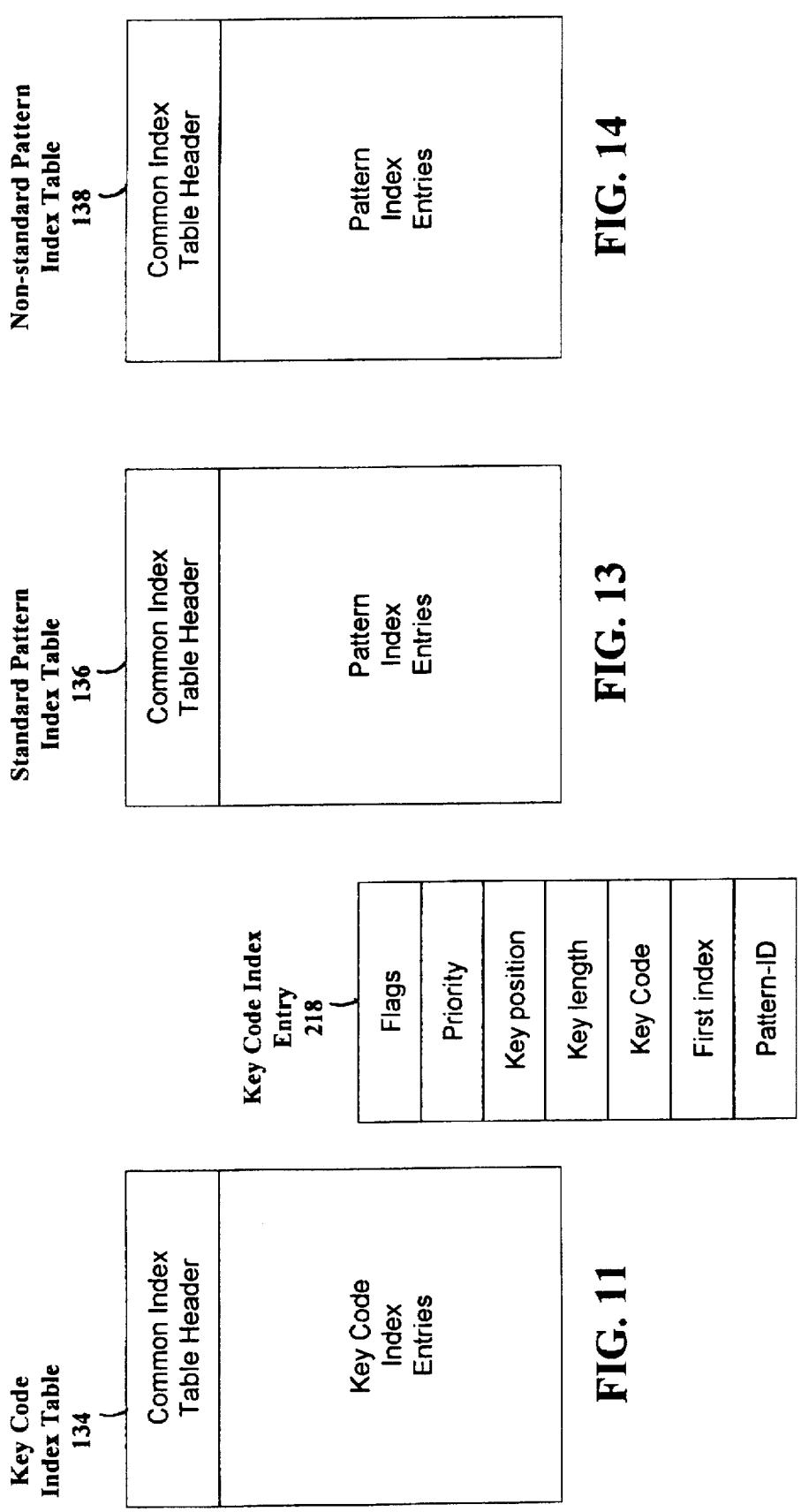

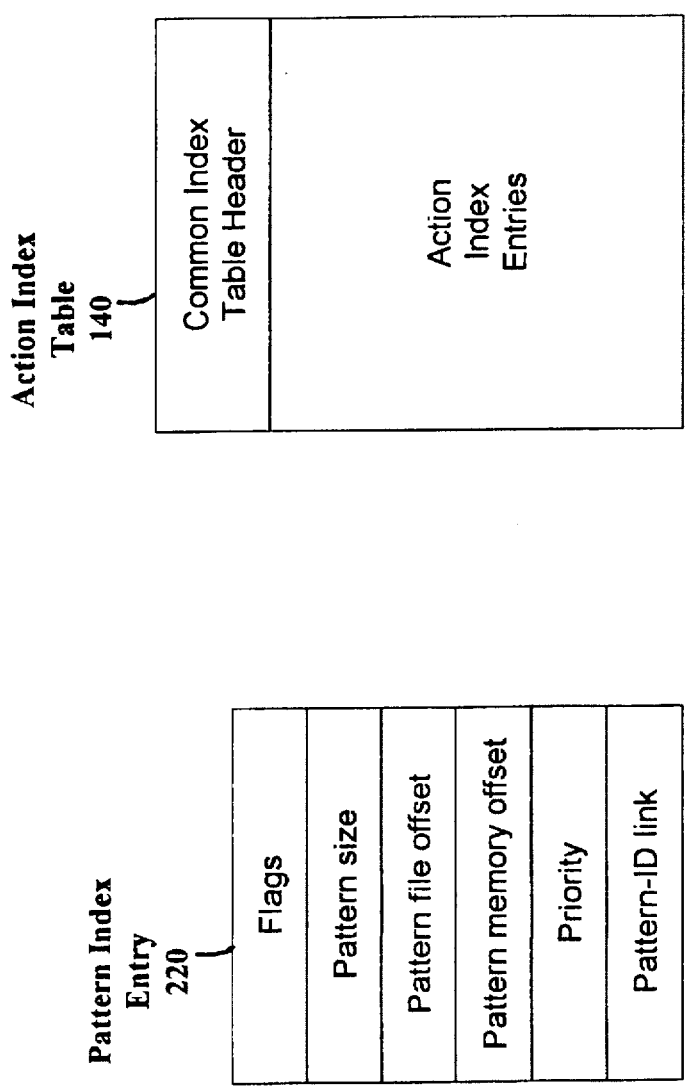

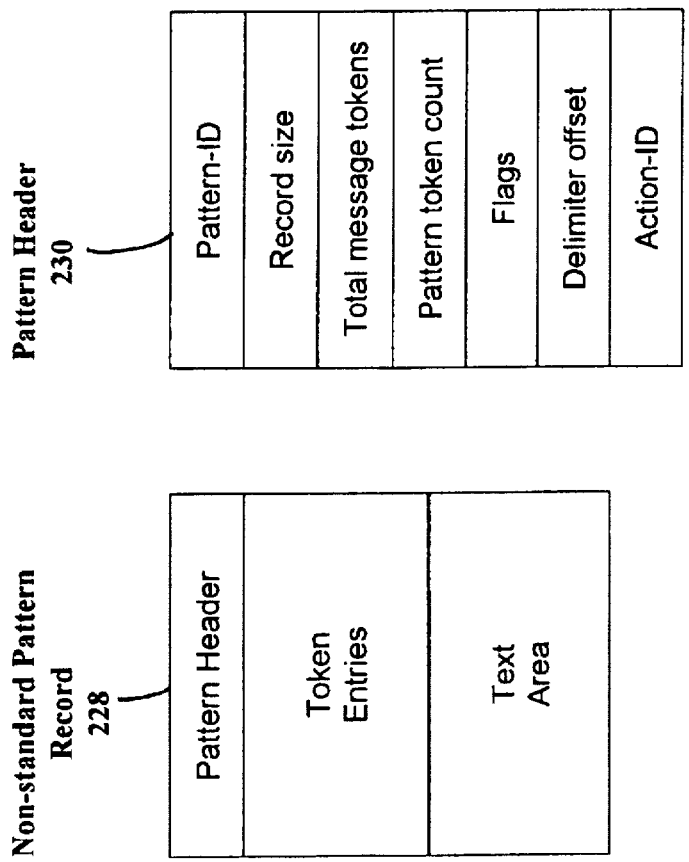
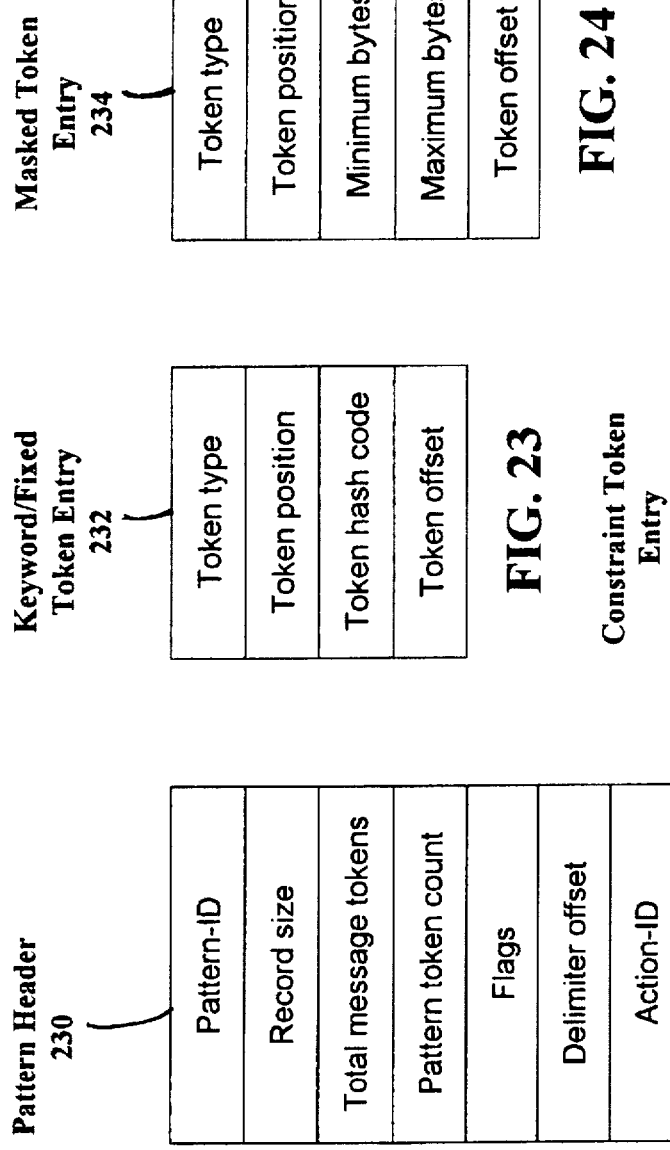
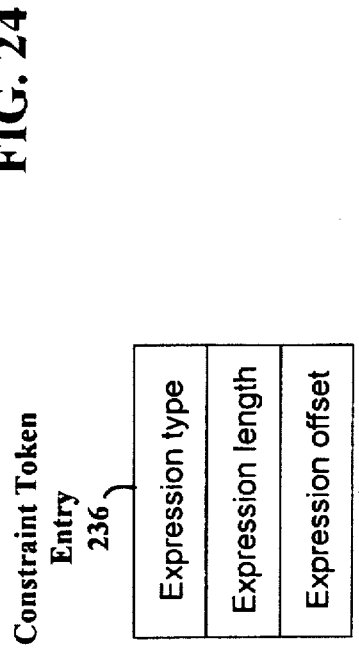

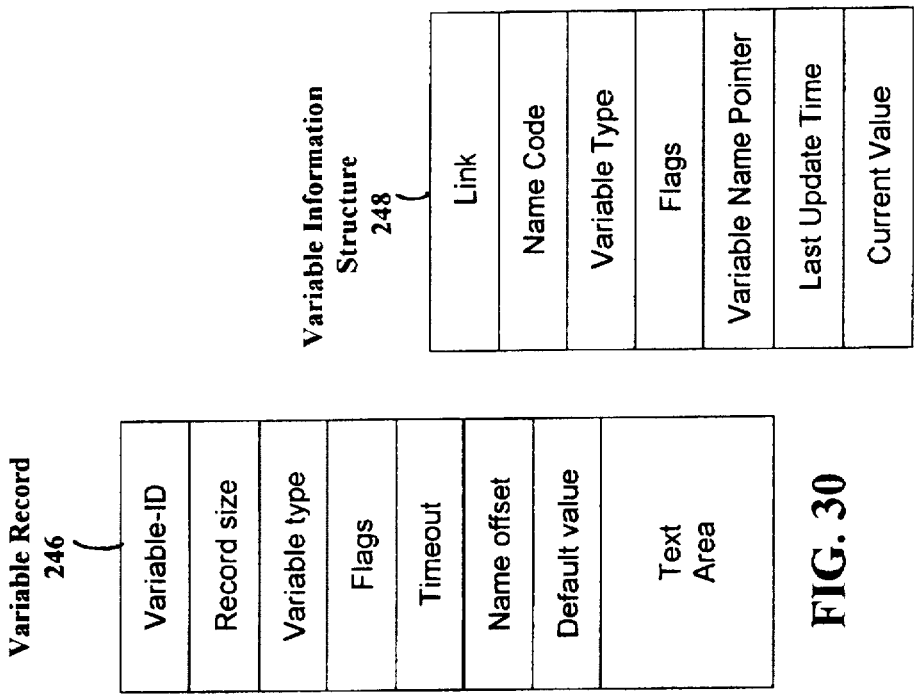
FIG. 31
FIG. 30
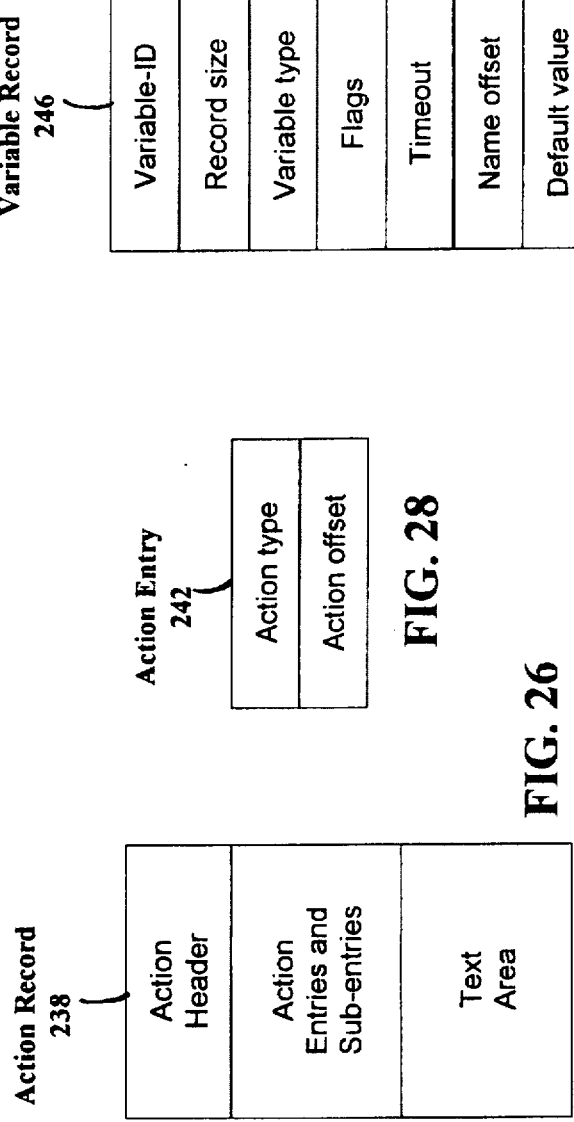
FIG. 29
FIG. 28
FIG. 26
FIG. 27
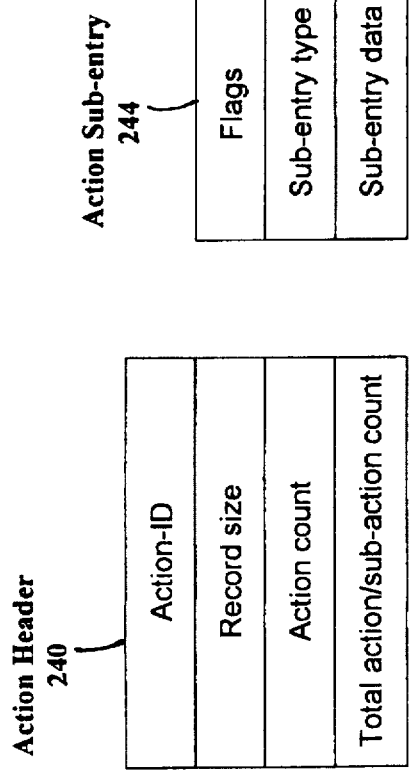

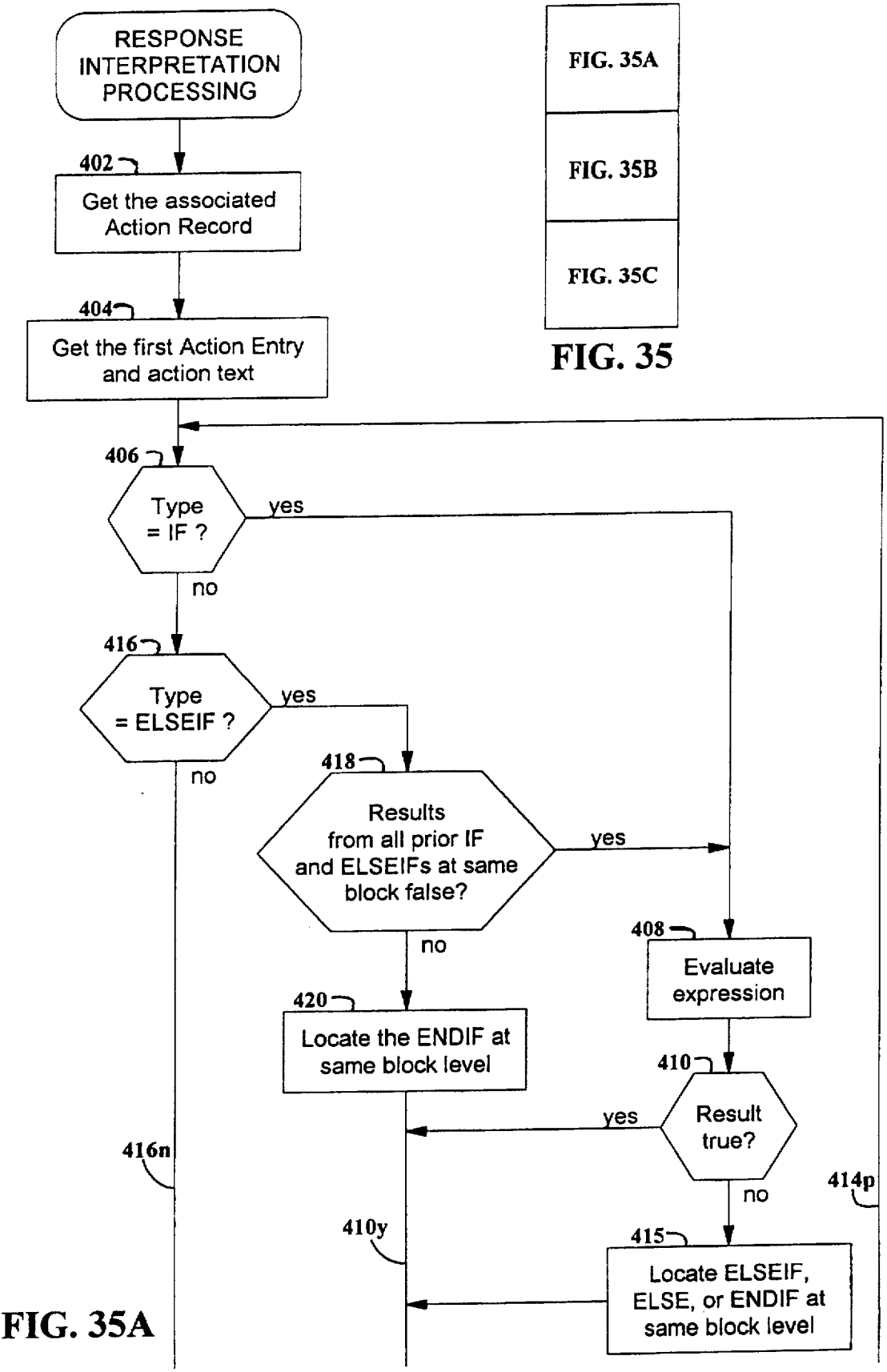

SYSTEM WITH USER SPECIFIED PATTERN DEFINITIONS FOR MATCHING INPUT MESSAGES AND ASSOCIATED DECISIONS FOR CONDITIONALLY RESPONDING TO THE INPUT MESSAGES

CROSS-REFERENCE

This patent application is related to the co-pending patent Application No., 08/521,203, entitled, "APPARATUS AND METHOD FOR MESSAGE MATCHING USING PATTERN DECISIONS IN A MESSAGE MATCHING AND AUTOMATIC RESPONSE SYSTEM," filed on Aug. 30, 1995 by Walster et al.

BACKGROUND

1. Field of the Invention

This invention generally relates to systems for monitoring messages and more particularly to systems for automatically performing predetermined functions in response to messages.

2. Description of the Prior Art

The prior art may be understood by way of explanation of prior systems for automating the operation of data processing systems because that is the context in which the present invention is utilized.

Data processing systems, such as the 2200 Series data processing systems from Unisys Corporation, have historically required human interaction for exerting control over the day-to-day operations of the system. Operator/system interfaces have included an operation console coupled to a system console port. Typical operation consoles included a keyboard for entry of control commands, a plurality of selector switches, one or more banks of indicator lamps, and a display screen for providing status information to the operator. Tasks performed at the operator console include: system booting, system configuration, job scheduling, file management, and responding to exception conditions and alarms.

In many systems, a common form of interaction between the operator and the system is to have the control software of the data processing system (e.g., the operating system) transmit character-based informational messages to the operation console (e.g., a VDT) for viewing by the operator. Based on the particular message displayed at the operation console, the operator may respond with an answer as input or initiate execution of a system command.

One drawback to the above form of operator/system interaction is that many of the system messages, as well as the format for the commands and responses, are cryptic. While a highly experienced operator might well know the appropriate steps to take (proper commands and or responses) in response to a given message or set of messages, an inexperienced operator may have to seek help or might mistakenly take inappropriate actions. An inappropriate response could lead to catastrophic consequences (e.g., system or subsystem shutdown).

Another disadvantage to the above form of operator/system interaction is the possibility of operator error. For example, a harried or distracted operator might mis-key a response or system command. Once again the cost of the mistake might be exorbitant.

Therefore, it would be desirable to decrease operator interaction to reduce the cost of operating data processing systems and to reduce the likelihood of costly errors. Various tools have been provided for automating data processing system operation. One such tool is the Smart Console software suite that operates in the operating environment of the 2200 Series systems.

Functionally, the purpose of Smart Console is to partially automate the operations of data processing systems. Software was constructed to execute on a micro-computer which was dedicated for use as an operation console. The console was programmed to receive messages from the system, search an operator defined database of pattern definitions for a pattern definition that matched the messages, and perform a user specified function which was associated with a matching pattern definition. Example functions that could be specified included operator commands, answers to questions presented in messages from the system to the operator, and directives to various alarm units. While not fully automating the operation of data processing systems, the Smart Console software provided the foundation for such automation.

SUMMARY OF THE INVENTION

With the Smart Console software described above, human operator intervention is not required every time a message is received at the operator console. However, the prior Smart Console is rather inflexible because of its inability to remember which messages it had received and a lack of user-definable decisional capabilities. In other words, the prior Smart Console system always took the same action in response to a given system message. Therefore, it was desirable to enhance the Smart Console to allow a user to track the messages received and to specify decisions upon which performance of the actions depends.

It is an object of the invention to build a database containing pattern definitions and associated function decisions and function definitions, where the pattern definitions are used for matching messages and the function decisions are used in governing the functions to be performed.

A further object of the invention is to enhance the selectability of the functions to be automatically performed in response to messages received, where the functions to be performed are dependent upon a matching pattern definition and associated function decisions and function definitions specified in a database.

Another object is to build a database containing pattern definitions and associated function decisions and function definitions, and to enhance the automation of functions to be performed in response to messages received, where the functions to be performed are dependent upon a matching pattern definition and associated function decisions and function definitions specified in a database.

Another object still is to build a database containing pattern definitions and associated function decisions and function definitions, where the function decisions include control structures and data structures.

Yet another object is to build a database containing pattern definitions and associated function decisions and function definitions, where the function decisions include control structures and data structures, and the control structures include if-then-else statements.

A further object is to build a database containing pattern definitions and associated function decisions and function definitions, where the function decisions include control structures and data structures, and the data structures include integer and string-type variables Still a further object is to build a database containing pattern definitions and associated function decisions and function definitions, where the decisions include control structures and data structures, and the data structures include group-type variables.

Another object is to build a database containing pattern definitions and associated function decisions and function definitions, where the decisions include control structures and data structures, and the data structures include variables for which time-out and default values are specified.

A further object of the invention is to enhance the automation of functions to be performed in response to messages received, where the functions to be performed are dependent upon a matching pattern definition and associated function decisions and function definitions specified in a database, where the function decisions include if-statements, variables, and group variables, where the variables have user-definable time-out values and default values.

These and other objects are attained in a system in which pattern definitions and response definitions are specified as the operating parameters for the system. The pattern definitions and response definitions are established in a pattern database with software for creating the pattern database. The response definitions are associated with specified ones of the pattern definitions in the database. Pattern definitions set forth the criteria for matching messages that are input to the system, and response definitions set forth the response. When the database is opened for pattern matching, an input message is processed by searching the database for a pattern definition that matches the input message and automatically responding according to the associated response.

Included in the response definitions are function definitions. Specified ones of the function definitions have associated function decisions. The function definitions indicate a function to be initiated and the function decisions are used to condition initiation of the functions. The function decisions provide for variable initiation of the specified functions.

Data structure definitions are also included in the pattern database. The data structure definitions include variables that may be used for storing portions of input messages and generally counting events.

The variables may be specified to include default values and time-out values. A variable with a default value is set to the default value before it is first referenced, and if the variable is not updated within a period of time specified by the time-out value, the value of the variable is reset to the default value. The time-out value provides for monitoring the number of instances that a message has been received within a specified time period and automatically and variably responding according to the number of instances.

The functions may be specified to include a wait value. The wait value is a time period that is specified to delay the initiation of an associated function.

The variables may be specified as having their values retained. For variables so specified, the values are saved when a different pattern database is used for message processing. If a retained variable is defined with the same characteristics in the newly opened pattern database, the variable's value will be carried forward for use in the newly opened pattern database. When the database is later reopened, the values are restored.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention.

Accordingly, the drawings and description are to be regarded as illustrative in nature, and not as restrictive.

BRIEF DESCRIPTION OF THE DRAWINGS

FIG. 4 shows example input for creating a Pattern Database;

FIG. 11 shows the content of the Key Code Index Table;

FIG. 12 shows the content of a Key Code Index Entry;

FIGS. 13 and 14 respectively illustrate the content of the Standard Pattern Index Table and the Non-standard Pattern Index Table;

FIG. 15 illustrates the content of a Pattern Index Entry;

FIG. 16 shows the content of the Action Index Table;

FIG. 17 shows the content of an Action Index Entry;

FIG. 21 shows the content of a Non-standard Pattern Record;

FIG. 22 shows the content of a Pattern Header;

FIG. 23 shows the content of a Keyword and Fixed type Token Entries;

FIG. 24 shows the content of a Masked Token Entry; FIG. 25 shows the content of a Constraint Token Entry;

FIG. 26 shows the content of an Action Record;

FIG. 27 shows the content of an Action Header;

FIG. 28 shows the content of an Action Entry;

FIG. 29 shows the content of an Action Sub-entry;

FIG. 30 shows the content of a Variable Record;

FIG. 31 shows the content of a Variable Information Structure;

FIG. 33 shows the relationship between FIGS. 33A and 33B.

FIG. 35 shows the relationship between FIGS. 35A, 35B, and 35C; and

FIGS. 35A, 35B, and 35C contain a flowchart of the Response Interpretation Processing.

DETAILED DESCRIPTION

Figure 1:
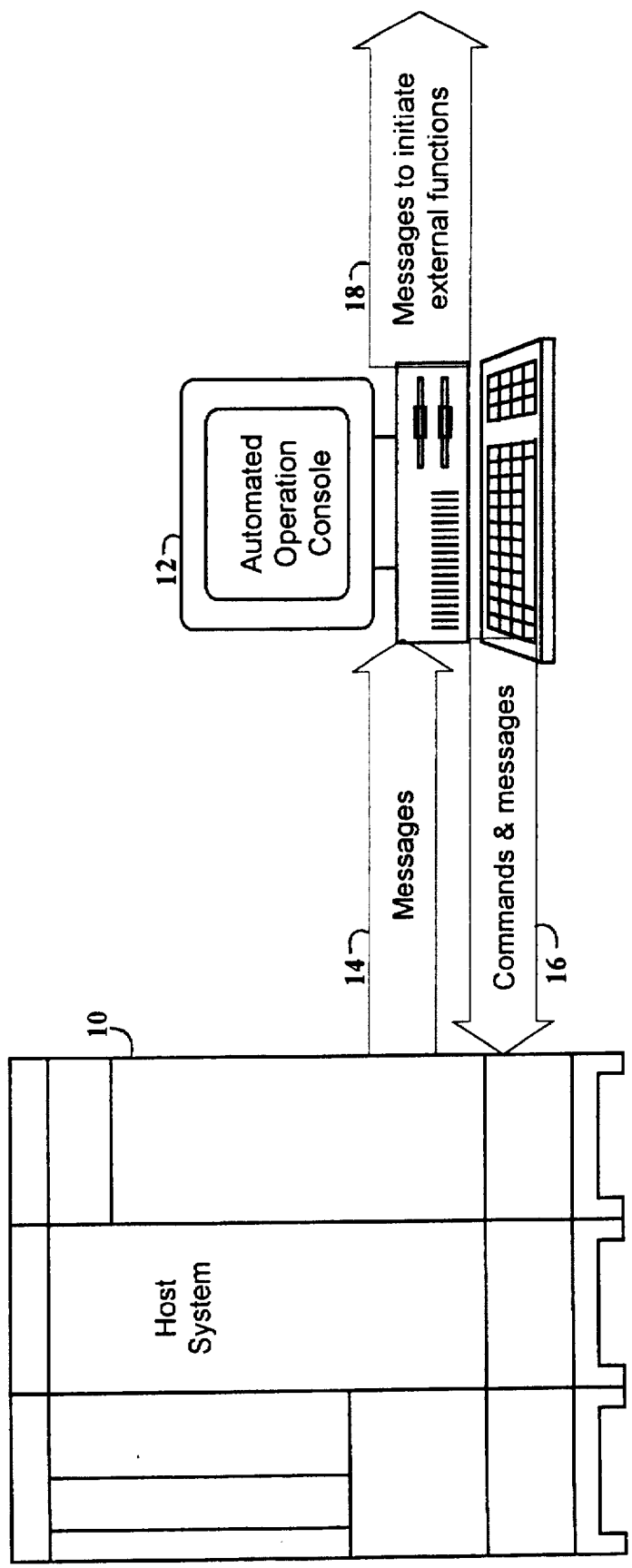
FIG. 1 illustrates an exemplary system in which the present invention may be used for message matching and automating functions performed in response to messages received.

FIG. 1 illustrates an exemplary system in which the present invention may be used for message matching and automating functions performed in response to messages received. The system of FIG. 1 includes a Host data processing system 10 and an Automated Operation Console 12. The Host is a 2200 Series data processing system which is commercially available from Unisys Corporation. The Automated Operation Console 12 is micro-computer based component that is coupled to the Host and provides a user interface for operational control of the Host.

While not shown, it should be understood that the Host 10 is intended to illustrate an entire data processing complex. The complex includes memory, instruction processors, input-output processors, channels, and peripheral subsystems. In addition, the Host embodies the control software for managing its resources. As related to the present invention, the Host's control software, as well as application software executing on the Host, sends messages to the Console 12. The messages are character based and the informational content of the messages varies according to the purpose for sending the message. Exemplary purposes for sending messages to the Console include: alerting the operator that there is a hardware problem, informing the operator of system utilization, or requesting a response from the operator. Line 14 illustrates the flow of messages from the Host to the Console.

Software on the Console 12 receives the Messages 14 from the Host 10 and processes them against a database of pattern definitions. Along with the pattern definitions, the database includes functions and decisions to be made prior to performing the functions. The database of pattern definitions, functions and decisions is defined by an operator or system administrator.

If the Console 12 finds a pattern definition in its database which matches a received message, the function decisions associated with the pattern definition are interpreted to determine whether to perform an associated function. As respectively illustrated by Lines 16 and 18, responses such as commands and messages are sent to the Host 10, and external functions may be initiated by messages that are sent elsewhere. The commands and messages that are sent to the Host include, for example, commands to modify the system configuration or an answer to a question presented to the operator in a message from the Host. The exemplary external functions include control codes to power control units.

Figure 2:
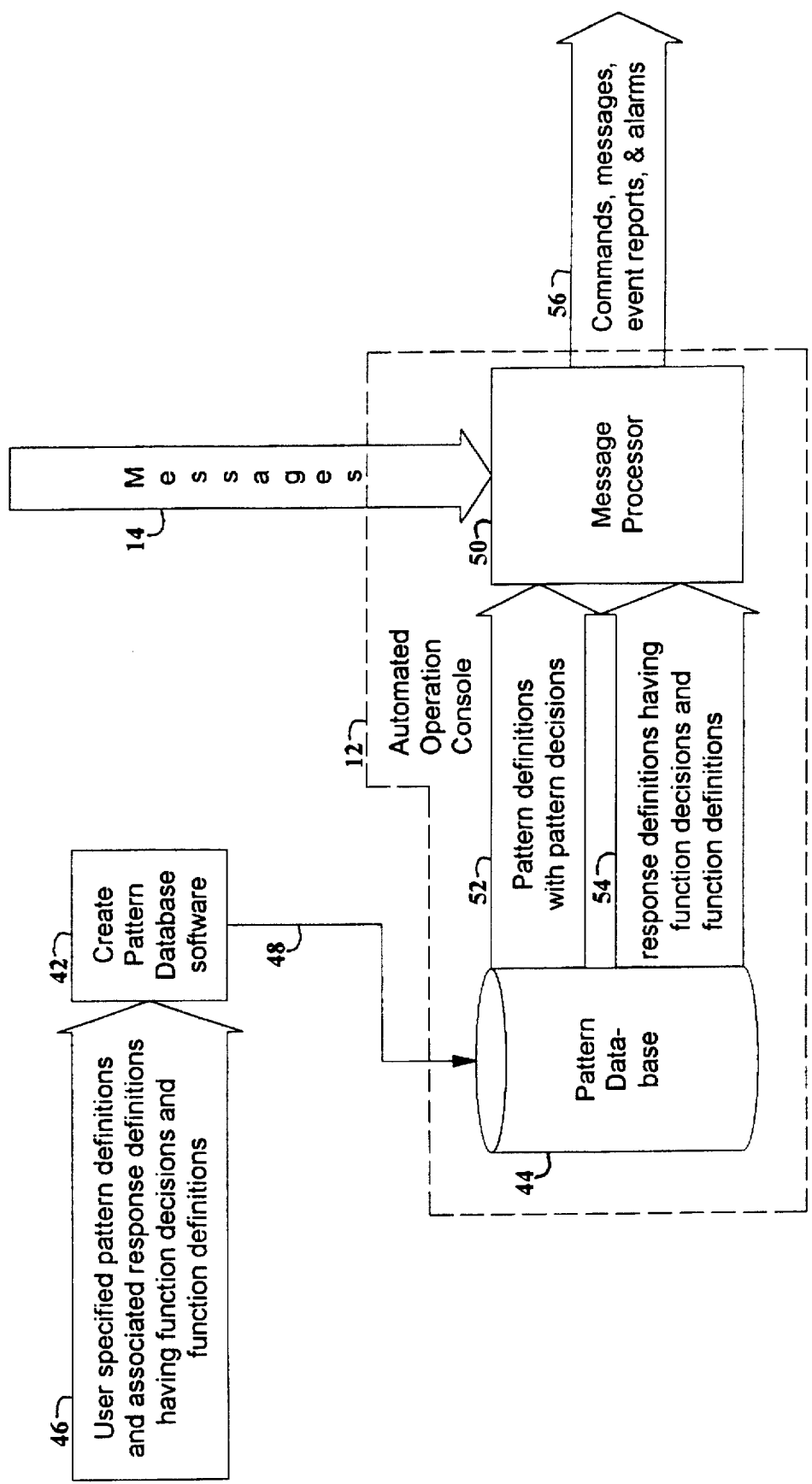
FIG. 2 is a functional block diagram of the system for matching input messages to user specified pattern definitions and automatically performing predetermined functions.

FIG. 2 is a functional block diagram of the system for matching input messages to user specified pattern definitions and automatically performing predetermined functions. Create Pattern Database software 42 takes user specified input and creates a Pattern Database 44. As shown by Line 46, input to the Create Pattern Database software 42 consists of pattern definitions and associated function decisions and function definitions. The pattern definitions specify criteria for matching messages, and the associated function decisions specify the decisions upon which performance of the functions depends.

In the exemplary system the Pattern Database 44 is static in the sense that once it has been established and opened-for processing on the. Console 12, its contents do not change. However, the Pattern Database may be replaced with an updated version as new input is provided to the Create Pattern Database software 42 and the Pattern Database is reestablished on the Console 12. Line 48 signifies the installation of the Pattern Database on the Console. In the exemplary system of FIG. 2, the Create Pattern Database software operates on a computer system other than the Console. Thus the installation of the Pattern Database takes place via file transfer via network or via a computer readable medium. Those skilled in the art will recognize that the processing for creating the Pattern Database could be performed on the Console, and the system could be tailored such that the Pattern Database is dynamic.

Message Processor software 50 receives messages as input over Line 14. In the exemplary system, the Message Processor operates on the Console 12. For each message received, the Message Processor searches the Pattern Database 44 for a pattern definition that matches the message. The pattern definitions, and any associated pattern decisions, are shown as being supplied to the Message Processor as Line 52. If the message fits within a pattern definition, the associated response definition, as shown by Line 54, is supplied to the Message Processor. The action definition may include a function decision along with a function definition.

If a response definition that is supplied to the Message Processor 50 includes a function decision, the Message Processor determines whether a specified function should be initiated based upon evaluation of the function decision. An affirmative decision results in the specified function being initiated. In the exemplary system the functions include internal functions and external functions. Internal functions are those in which the Message Processor performs the desired function, and external functions are those in which a processor that is external to the Message Processor performs the desired function. An example internal function is adjusting the value of a variable that is defined in the Pattern Database 44. Example external functions include alarms, commands, and other types of messages being transmitted. Line 56 illustrates the output from the Message Processor.

Figure 3:
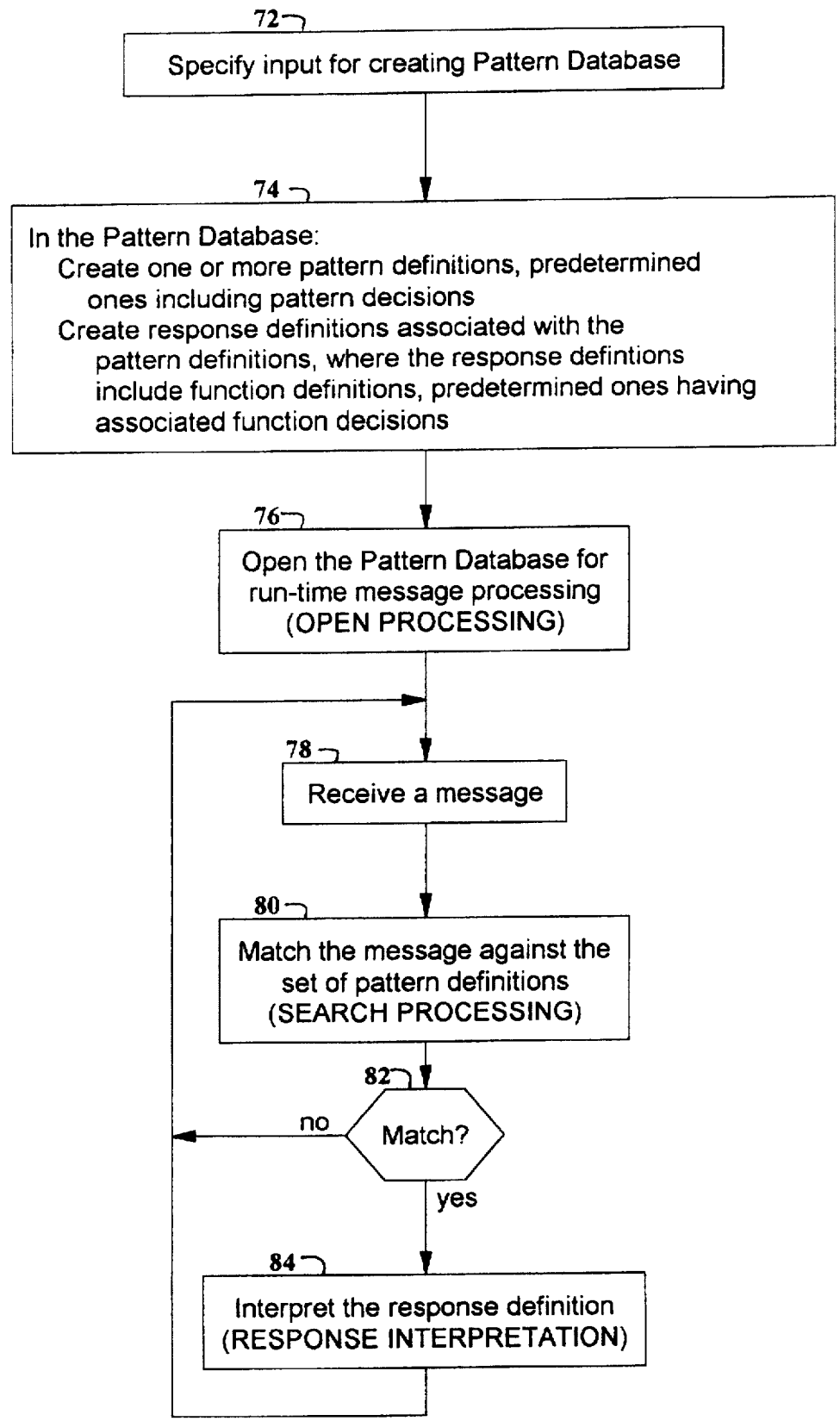
FIG. 3 is a flowchart of the processing for creating a Pattern Database and processing messages against the Pattern Database for automatically and variably responding to the messages.

FIG. 3 is a flowchart of the processing for creating a Pattern Database and processing messages against the Pattern Database for automatically and variably responding to the messages. Steps 72–74 correspond to the processing of the Create Pattern Database software 42, and Steps 76–84 correspond to the processing by the Message Processor software 50.

At Step 72, the input to the Create Pattern Database software is specified. The format and intended functionality of the input definitions are described further in the following paragraphs.

Pattern Database Concepts and Definitions A Pattern Database 44 consists of pattern definitions that are used for matching messages and response definitions that are automatically interpreted when messages are matched. The Database may also include definitions of variables that add flexibility to pattern matching and automatically performing user-specified functions.

Pattern Matching The Message Processor 50 recognizes a message received as input by comparing it to a Pattern Database 44 of patterns definitions. The Message Processor breaks the message apart into parts called tokens. The Message Processor uses either userspecified or default delimiters to separate a message into tokens. The Message Processor compares these message tokens to the predefined pattern tokens in the Pattern Database. The Pattern Database is organized to optimize pattern-matching efficiency. Patterns within a Pattern Database are classified by message type, sender type, and pattern type.

There are two types of patterns that can exist in a Pattern Database, standard patterns and non-standard patterns. The majority of input messages can be matched by standard patterns. Standard patterns use spaces (the default delimiter) to separate the tokens of a input message. Standard patterns can contain a unique token, called a keyword token. The Message Processor processes standard patterns with keywords more efficiently than standard patterns without keywords. Standard patterns without keywords, although processed less efficiently, offer other advantages for pattern matching. Like standard patterns with keywords, they use standard delimiters and check the number of tokens in the message by default.

Nonstandard patterns use characters other than spaces as delimiters (for example, asterisks). Delimiters can be specified for use in nonstandard patterns. The Message Processor checks for messages matches to nonstandard patterns after it has checked for matches to standard patterns.

A delimiter is a character that indicates the start and end of a string of characters called a token. The Message Processor 50 uses spaces as the default token delimiters, but any character may be defined as a delimiter. A set of delimiter characters may also be defined for a message, or an ordered list of delimiters for a message.

Assuming that a space is the delimiter, the message:

XX/YY//ZZ A:/B C yields the following tokens:

| XX/YY//ZZ |
|---|
| A:/B |
| C |

The Message Processor considers multiple spaces to be a single delimiter (such as between B and C).

A delimiter set is a number of delimiter characters that can occur in any order in the message. Assume the following message:

XX/YY//ZZ A:/B C

If a pattern has a delimiter set of {/ }, which means a slash or a space, it produces the following tokens:

| XX |
|---|
| YY |
| ZZ A |
| B C |

If two or more delimiters are in a row, they are treated as a single delimiter even if they are separate characters.

If a pattern has a delimiter set of {:/}, which means a colon or a slash, the same message yields the following tokens:

| XX |
|---|
| YY |
| ZZ A |
| B C |

A delimiter list is a string of character delimiters that are specified in the order that they appear in the message. Assume the following message:

XX/YY//ZZ A:/B C

If a pattern has a delimiter list of "//" (slash, slash, space, and space), it produces the following tokens:

| XX |
|---|
| YY |
| ZZ |
| A:/B |
| C |

If a pattern has a delimiter list of "/ :/(slash, space, colon, and slash), the same message yields the following tokens:

| XX |
|---|
| YY//ZZ |
| A |
| B C |

The delimiters, "", ":" and "/" are treated as a single delimiter because they occur adjacent to each other with no intervening characters. The delimiter character should be specified only once in the list if it appears in two or more consecutive positions.

Tokens are the building blocks of pattern definitions. They are numbered from left to right within a message (1 to n). Assume the default delimiters are spaces and the following message:

THIS IS A MESSAGE

Token number 1 is THIS, token number 2 is IS, token number 3 is A, and token number 4 is MESSAGE.

There are four token types: Fixed, Keyword, Masked, and Run-id. Each type is defined below:

Fixed: A sting of characters that must match the message token exactly, character for character.

Keyword: A special type of fixed token that is the most unique portion of a message. Standard patterns that have one keyword token are most efficient for pattern matching. Nonstandard patterns can be matched more efficiently if a keyword is specified.

Masked: Used to match variable data (such as a tape number) within a message.

Run-id: A special type of masked token specified when the action must depend on the value of the run-id generating the message. OS-2200 messages have a blank run-id.

The following example shows the different token types that could be specified for the following message:

IS TAPE ON drive-name A LABELED TAPE Y, N, REEL

The pattern definition could consist of a fixed token in position 2, a masked token in position 4, and a keyword token in position 6. The word TAPE is a fixed token in position 2 because it always appears that way in the message. The word LABELED is also fixed but it has been chosen to be the keyword token for this message. The word drive-name is a variable word, as shown. If the following message appears:

IS TAPE ON UNIT4 A LABELED TAPE Y,N,REEL

The fourth token would be masked for the purpose of matching the above pattern. Note that if this fourth token was fixed, it would only match UNIT4. (in some cases, this might be desirable).

One or more tokens from a message can be referenced with a positive token number or a negative token number. Tokens can be referenced either by their associated token numbers or with the descriptive, predefined variable prefixes, \_TOKEN and \_NEGTOKEN.

The following example shows how to reference the fourth message token:

\_TOKEN4\

Alternatively, the fourth message token could be referenced this way:

\4\

If the token of interest is at or near the end of the text, or if portions of the text vary, use the negative token variable (\_NEGTOKENn). When negative numbers are used, the tokens are numbered from right to left instead of left to right. The following example shows how to reference the right-most token:

\_NEGTOKEN1\

Another way to reference the token is by using its token number, as shown in this example:

\-1\

Responses

Response definitions are interpreted upon the matching of messages and are defined in a Pattern Database in pattern definitions. The response definitions provide the automation in the database to perform such functions as:
- Update the display of the Automated Operation Console
- Execute an automated response to a system message
- Perform changes to the values of variables that have been defined in the database
- Apply decisions to the execution of functions Variables Variables provide the ability to store information from a message so that it can be retrieved for later use during pattern matching, substitution, and logic processing. Variables provide the ability to do such things as:
- Store integer and string information
- Reset the value of a variable after a given period of time
- Dynamically create variable values at run-time There are two kinds of variables: predefined and user-defined. A number of predefined variables are available to the user and are maintained internally by the Message Processor. In addition, user-defined variables can be explicitly set by the user and need to be defined in the Pattern Database before they can be used. Predefined Variables cannot be set by the user and do not need to be defined before they can be used.

The Message Processor 50 supports the use of expressions in pattern matching and response definition. Expressions are a series of operands and operators that whose computation yields a value. Expressions are useful when adding decisions and variables to the action definitions in the Pattern Database 44.

Input to Create Pattern Database

The input for creating the Pattern Database 44 is a series of commands. The commands are composed of a command name followed by one or more parameters. The parameters may be specified in any order, but they must be separated by spaces or commas. More than one command may be included per line and separated by one or more spaces.

Individual commands may be split across input lines by using the backslash (\) as a continuation character. A space must be included before the backslash, and all characters after the backslash are ignored.

In this section, commands and parameters appear in uppercase text, and user-supplied information appears in lowercase italics. Brackets [ ] indicate optional parameters. An ellipsis ( ... ) indicates that the preceding parameter may be repeated any number of times.

All commands and parameters can be abbreviated as follows:
- Abbreviated to five characters ELSEIF
- Abbreviated to four characters
  CONTIUOUS-DISPLAY
  CONSTRAINT
  ENDIF
  PRIMARY
  PRIORITY
  PRIVILEGED-EXEC
  RESET
  RESPONSE
- Abbreviated to three characters All other commands and parameters The Create Pattern Database software uses strings and sets to group related characters. Strings are denoted by enclosing the characters within quotation marks (" "), while sets are denoted by enclosing them within braces ({ }). There are several special operators that may be use within strings and sets. These operators are always preceded by and usually followed by a backslash (\):

\\ indicates one backslash is desired within a string or set.

The following operators are for strings only:

\" is used to indicate that a quotation mark is desired within a string.

\*n\ is used within mask strings to indicate the maximum number of optional characters (n is a number from 1 to 255). the asterisk (*) indicates that the string can have 0 to n characters.

\?n\ is used within mask strings to indicate a place-holder character (n is a number from 1 to 255). The question mark (?) indicates that the string must have n characters.

\var-name\ where var-name is the name of a predefined or user-defined variable.

The following operators are for delimiter sets only:

\{ indicates a left (open) brace is desired within a set.

\} indicates a right (close) brace is desired within a set.

Examples

"apples\\ and oranges \""

The string is interpreted as apples \ and oranges".

"TA\?2\\*2\"

Mask string starting with TA, followed by at least 2 more characters but no more than 4.

"RC\_RUNID\"

Command string using text substitution to create an RC console command using the generated run-id of the message.

"RV\3\"

Command string using message token text substitution to generate an RV console command using the third token from the message.

{:\}}

A delimiter set containing the character: and }.

Comments may be inserted anywhere a space or blank is valid, but not within quoted strings or delimiter sets. Comments begin with /* and end with */. For example /* This is a comment */

These comments are not saved in the Pattern Database.

General Command Layout for Pattern Definitions

All pattern definitions begin with the DEFINE command. This command is used to create or redefine a pattern. This command uniquely identifies the message pattern in the database by assigning it a message-id consisting of the group and message number.

The following commands show the general syntax for a pattern definition:

```
DEFINE "group"[message-number]
MESSAGE "message-text"
[TYPE[message-type][sender-type . . . ][TEST][VARIABLE-LENGTH]]
    [INSTANCE[instance-type . . . ]]
    [PRIORITY value]
    [DELIMITERS delimiter-spec]
    TOKEN[token-type] number ['token-text"]
    [CONSTRAINT expression]
    [ACTION mode action-type "action-text"[WAIT xx[time-unit]]
    [CREATE variable-group-name:member-name]
    [DESTROY variable-group-name:member-name]
    [SET target-variable = variable-expression]
    [RESET target-variable]
    IF expression
    [actions]
    ELSEIF expression
    [actions]
    ELSE
    [actions]
    ENDIF
END
```

The DEFINE command begins a message pattern definition. It identifies a unique pattern in a Pattern Database by its group and message number. All pattern definitions must begin with a DEFINE command. The format of the DEFINE command is:

DEFINE "group"[message-number]

where group is the group-id associated with the message. It must be enclosed within quotation marks. Group-ids cannot contain embedded spaces.

Related messages may be grouped together for reporting purposes to support site needs. The groups have no effect on pattern matching. A group-id is from 1 to 12 characters.

Group-ids must be specified as strings of ASCII characters. They can contain any printable ASCII character except an embedded space or backslash. THE MESSAGE PROCESSOR removes leading and trailing spaces. A maximum of 256 groups in a database is allowed. A blank or null group-id is not allowed. Examples of group-id are:

| "boot-msgs" | "cms-msgs" | "mapper" |
| --- | --- | --- |

Examples

DEFINE "eastsite" 2

Defines or replaces a pattern with message number 2 in group-id eastsite. DEFINE "xyz123"

A new pattern is added to the group-id xyz123 and the next available message number is automatically assigned.

The MESSAGE command is required and must immediately follow the DEFINE command. It defines the text of the input message to be matched. The Create Pattern Database software breaks apart this text into message tokens that the Message Processor uses while searching the database for a pattern match.

The Message Processor uses the total number of tokens in the message text as a criterion for matching all standard patterns unless the TYPE command includes VARIABLE-LENGTH. A match does not occur if the number of tokens in the message does not match the total token count of the pattern definition. In addition, the Message Processor cannot match message that are completely blank. Furthermore, the number of tokens defined in MESSAGE must be at least as many as the highest token number that is referenced in the pattern.

The format of the MESSAGE command is:

MESSAGE "message-text"

where message-text is a string containing the exact text of the message.

The TYPE command is used to specify:

- The message type Message type distinguishes among READ-AND-REPLY, OTHER, CONTINUOUS-DISPLAY, and SCF messages.

Message-type information is used to identify, with greatest efficiency, messages that can cause a response action. The message types READ-AND-REPLY, OTHER, CONTINUOUS-DISPLAY, and SCF are unique to 2200 Series data processing systems.

- The sender tppe Sender type is used to identify the type of run that issued the message. Patterns can be associated with one or more sender types. TYPE is useful for preventing unauthorized use of a message. Specifying a sender type of PRIVILEGED-EXEC ensures that a non-privileged user cannot send a matching message that triggers undesirable actions. The sender type PRIVILEGED-EXEC is unique to 2200 series data processing systems and therefore, beyond the scope of the present invention.
- A test pattern When TEST is specified, the display enhancement and automation actions of the pattern are logged instead of executed. Function decisions and actions on variables are executed and logged.
- A pattern of variable length TYPE is one of four separate attribute commands: TYPE, PRIORITY, INSTANCE, and DELIMITERS. Default values are used if values are not specified for them. The commands may be specified in any order, but they must follow the MESSAGE command and precede all TOKEN and ACTION commands.

The format of the TYPE command is:

TYPE [message-type][sender-type . . . ][TEST] [VARIABLE-LENGTH] where message-type is one of the following:

- READ-AND-REPLY for read-and-reply messages
- OTHER for read-alert, read-only messages, and the Message Processor internal message for database activation and deactivation
- CONTINUOUS-DISPLAY for the continuous display data sent by the Exec
- SCF for system control facility (SCF) messages For the purposes of pattern matching, The Message Processor considers read-alert and read-only messages to be equivalent. The default is OTHER.

The sender-type is one of the following:

- PRIVILEGED-EXEC for messages sent by either the Exec or a privileged run.
- NON-PRIVILEGED for messages sent by a non-privileged run.
- ANY-SENDER matches all sender types.

TEST is specified for a test pattern. The Message Processor does not perform the actions specified for display enhancement and automation actions; it sends messages to the system log file and displays them on the screen. For function decisions and performing functions on variables the Message Processor executes the actions, and sends messages to the system log file and displays them on the screen.

VARIABLE-LENGTH is specified to override the automatic check for total token count in a message. This keyword can be specified for standard patterns with or without keywords; it has no effect on nonstandard patterns.

Examples

```
DEFINE "tapemsg" 20
    MESSAGE "IS TAPE ON unit# A LABELED TAPE Y,N,REEL"
    TYPE PRIVILEGED-EXEC READ-AND-REPLY
```

Message text is defined for read-and-reply message number 20 in group-id tapemsg, sent by either the Exec or a privileged run.

```
DEFINE "group2"
    MESSAGE "THIS IS A USER MESSAGE"
    TYPE ANY-SENDER TEST
```

Message text is defined for a read-alert or read-only message sent by any run. It recognizes this as a test pattern.

The INSTANCE command is used to indicate which instance of a read-only or read-alert message should be matched when multiple system consoles are attached to a 2200 Series system. INSTANCE is one of four separate attribute commands: TYPE, PRIORITY, INSTANCE, and DELIMITERS. The default values if values are not specified for them. These attribute commands can be specified in any order, but they must follow the MESSAGE command and precede all TOKEN and ACTION commands. The format of the INSTANCE command is:

INSTANCE [instance-type . . .]

where instance-type is one of the following:

- PRIMARY is the primary instance of the message.
- ECHO is the secondary or echo instance of the message.
- ANY-INSTANCE is any instance of the message, primary or echo.

The PRIORITY command is used to assign a special priority from 0 to 255 to a pattern. The priority determines the search order of patterns of the same pattern type. The lower the number, the higher the priority. The Message Processor searches the lowest numbers first in the event of a pattern search conflict. The Message Processor search the priority of standard patterns with keywords first, of standard patterns without keywords second, and nonstandard patterns last. The Message Processor stops searching the database after it find a pattern match. PRIORITY is one of four separate attribute commands: TYPE, PRIORITY, INSTANCE, and DELIMITERS. All attributes are optional, and default values are used if values are not specified. The attribute commands may be specified in any order, but they must follow the MESSAGE command and precede all TOKEN and ACTION commands. The format of the PRIORITY command is:

PRIORITY value where value is the priority associated with the pattern, from 0 (highest priority) to 255 (lowest priority). The default value is 128.

Under certain circumstances, the order that the Message Processor searches for patterns becomes important, and the search order can be controlled using pattern priority.

Each pattern in the database has an associated priority. For standard patterns, the Message Processor uses this priority to determine the search order for patterns that share a particular keyword. The priority does not affect the order that the Message Processor searches for keywords. The priority is only used after the Message Processor finds a keyword match. If a message matches patterns with different keywords, the priority is not used. The Message Processor searches standard patterns without keywords and nonstandard patterns strictly in order of priority. The search order for standard patterns without keywords and for nonstandard patterns using the same priority value cannot be predicted.

The DELIMITERS command specifies the delimiters in a nonstandard pattern. This command is needed only when the Message Processor needs delimiters other than spaces to break a message into tokens.

Delimiters may be specified as a list (enclosed in " ") or as a set (enclosed in { }). A DELIMITER list is a string of character delimiters specified in the order in which they appear in the message. A delimiter set is a number of delimiter characters that can occur in any order in the message. If a DELIMITERS command is not used, it is assumed that the pattern is a standard pattern (with spaces as the delimiters).

DELIMITERS is one of four separate attribute commands: TYPE, PRIORITY, INSTANCE and DELIMITERS. All commands are optional, and default values are used if commands are not specified. The attribute commands may be specified in any order, but they must follow the MESSAGE command and precede all TOKEN and ACTION commands.

The format of the DELIMITERS command is:

DELIMITERS delimiter-spec where delimiter-spec are the delimiters for the Message Processor to use when breaking up the input message into tokens. If delimiters are specified as a list, they must be enclosed in quotation marks (" "). To use a quotation mark in a delimiter list, it must be preceded by a backslash. If delimiters are specified as a set, enclose them it braces ({ }). To use a brace in a delimiter set, it must be preceded by a backslash.

If an entire message is to be treated as one token, two consecutive quotation marks (" ") must be specified. The Message Processor considers this the null delimiter list.

The Message Processor automatically strips off leading and trailing spaces from a input message. The delimiter list should not include characters meant to strip off leading and trailing spaces. For example, for the message:

This is a list: x,y,z and d

The delimiter list ":,, " (three spaces, colon, space, comma, space, comma, and three spaces) could be used, or the delimiter set {:,} (space, colon, comma) could be used, either of which would result in these tokens:

|  |
|---|
| This |
| is |
| a |
| list |
| x |
| y |
| z |
| and |
| d |

The TOKEN command is for defining message pattern tokens. To optimize efficiency, only those tokens that are needed to identify the message (although as many pattern tokens as there are message tokens may be defined) should be defined. The TOKEN command uses equality test, unlike the CONSTRAINT command that can be a variety of comparison operators. The format for the TOKEN command is:

TOKEN [token-type]number "token-text"

where token-type is one of the following:

KEYWORD For the most efficient pattern matching, use the keyword token with standard patterns. THE MESSAGE PROCESSOR allows only one keyword token per pattern. Keyword tokens are used to identify the most unique, fixed portion of the message text. Token text is optional with a keyword token.

FIXED Fixed tokens are used to match text in which every character must match character for character.

MASKED Masked tokens are used to match either portions of text or text that varies from message to message.

RUNID Run-id token. A token number is not used, but token text must be specified. THE MESSAGE PROCESSOR allows only one run-id token per pattern.

If a token type is not specified, THE MESSAGE PROCESSOR assume a type of FIXED or MASKED, depending on whether or not the token text contains a mask specification.

number specifies the position of the token within the message. Token numbers can range from 1 to n, where n is the total number of tokens in the message. A token number must be specified for all token types except run-id tokens. The TOKEN command does not support negative token numbers.

token-text is a string containing the text of a token. Token text can be fixed characters and masked operators, depending on the type of token. If token text is not specified for keyword, fixed, or masked tokens, THE MESSAGE PROCESSOR assumes the text found in the specified message text at that token position. If token text is specified, THE MESSAGE PROCESSOR compares it to the message text for correctness. Token text is optional, except for run-id tokens.

A masked token is specified by using a mask string. A mask string consists of fixed characters and special mask operators. The mask string allows pattern matching on partial message tokens. There are two types of mask operators: optional and place-holder. The optional mask operator means that any number of characters up to the number specified (0 to n) can appear in the position of the token. The format for the optional mask operator is *n, where n is the maximum number of optional characters, from 1 to 255. For example, the optional mask operator of TA\*2\ matches the following:

|  |
|---|
| • TA |
| • TA1 |
| • TA2 |
| • TA33 | but does not match the following:

|  |
|---|
| • T |
| • TB |
| • TC1 |
| • TA111 |

The place-holder mask operator specifies that a specific number of characters appear in the position of the token. The format for the place-holder mask operator is \?n\, where n is the required number of characters, from 1 to 255. For example, the place-holder mask operator of TA\?2\ matches the following:

|  |
|---|
| • TA11 |
| • TABC |
| • TA/* |
| • TA-3 | but does not match the following:

|  |
|---|
| • TA |
| • TA1 |
| • TA111 |
| • TB12 |

The CONSTRAINT command adds decisional logic to the pattern-matching process. The CONSTRAINT command effectively creates a pattern decision upon which a decision is based as to whether a message matches the pattern definition. Any number of CONSTRAINT commands may be included in a pattern definition in a Pattern Database. CONSTRAINT commands may be used with or instead of TOKEN commands. If TOKEN and CONSTRAINT commands appear in the same pattern, TOKEN commands are evaluated first. Masked tokens cannot be used with the CONSTRAINT command.

The CONSTRAINT command uses an expression to limit pattern matching. The result of the expression must be non-zero for the pattern to match the message. If the result of the expression is zero, then no pattern is matched. If more than one CONSTRAINT command is present in a pattern, the result of the expressions in each of the CONSTRAINT commands must be non-zero for the pattern to match the message. Pattern matching does not succeed in the event of a run-time error, such as an invalid token number reference.

The format of the CONSTRAINT command is:

CONSTRAINT expression where expression provides the decisional logic for pattern matching to occur. The expression must evaluate to a non-zero integer value for the pattern to match the message.

The following example shows part of a pattern definition that matches a DEVERR message associated with device "DEV1" or "XYZ" that occurred on a path that included "IOP1" as the jop. This example is more efficient than using a nonstandard pattern or masking.

```
DEFINE "DEVICE"
    MESSAGE "device ip/iop/cm/cu DEVERR function run-id responses"
    TOKEN   KEY 3
    CONSTRAINT (\1\ = "DEV1" | \1\ = "XYZ")
    CONSTRAINT (\2 {/} 2\ = "IOP1")
```

Backslashes are required around token numbers, such as \1\. Backslashes are optional when referencing tokens with the _TOKEN predefined variable, such as _TOKEN1. For example, CONSTRAINT (_TOKEN1="DEV1") is equivalent to:

CONSTRAINT (\_TOKEN1\="DEV1")

The Message Processor allows use of two types of variables, predefined and user-defined. Predefined variables are maintained by the Message Processor and user-defined variables are defined and maintained by the user.

All predefined variables begin with a leading underscore (_) to distinguish them from user-defined variables. However, the predefined variables DT, IMAGE, MESSAGE, RRID, and RUNID can be specified without the leading underscore since they predate this convention. The Message Processor provides the following predefined variables:

- _ALL is a string variable and contains all the members of a variable group.
- _DAY is a string and contains the name of the day of the week, for example, Monday, Tuesday, and so forth.
- _DAYNUM is an integer and represents the day of the week as follows:
  Integer Day
  1 Monday
  2 Tuesday
  3 Wednesday
  4 Thursday
  5 Friday
  6 Saturday
  7 Sunday
- _DBNAME is a string and contains the name of the database that is currently active. The database name is always in lower case.
- _DT is a string and contains the current date and time from the system console's PC clock. The output format of the date-time substitution is mmddyy hhmmss
- _ERRORS is an integer and is the number of errors encountered while processing the actions for a matched pattern.
- _IMAGE is a string and contains the text of the message as it appears on the console, including the read-and-reply numbers and Exec prefixed run-ids.
- _NEGTOKENn is a string and contains the text of a message token associated with a negative token number. n is an integer token number. An alternative way to reference a message token number is \-n\.

- _RRID is a string and contains the unique read-and-reply identifier (RRID) of the matched message. The RRID is an 8-character string assigned by the system console to a read-and-reply message. RRID substitution can be used only with actions associated with read-and-reply patterns.
- _RUNID is a string and contains the run-id associated with a matched message. The run-id associated with an Exec message is always blank.
- _STATUS is an integer and is the result of the previous action. Included in this variable are results from action types specified by the ACTION command, the WF-ELSEIF-ELSE-ENDIF construction, and the SET, RESET, CREATE, and DESTROY actions.
  Possible values are:
  1 (Warning)
  0 (Action executed)
  −1 (Error)
- _TOKENn is a string and contains the text of the message token associated with a token number. n is an integer token number. An alternative way to reference a message token number is n.
- _TOKENS is an integer and is the number of tokens in the message.

User-defined variables must be defined before they can be used. A maximum of 2,720 variables can be defined in any database. A variable must be defined with a name, as a variable or as a variable group and, a type. A default value and a time-out value are optional.

A variable group is a collection of dynamically created members that share common characteristics that are user defined. With these common characteristics, a template for each member of a variable group is created. There group characteristics are:

- The variable type can be integer or string.
- The default value
- The time-out value
- Whether or not the variable value is retained when another database is activated Once the variable group is defined, members within the variable group may be created. The members have a unique name within the group and a unique value.

All variable definitions begin with the DEFINE command. The DEFINE command uniquely identifies each variable in a database by assigning it a variable-name.

The following commands show the general layout of commands for defining each user-defined variable in a database:

```
DEFINE     VARIABLE  [GROUP] "variable-name"
   [TYPE    variable-type [RETAINED]]
   [DEFAULT default-value]
   [TIME-OUT time-out-value [time-unit]]
END
```

- DEFINE Begins each variable definition. Use to define variables as well as variable groups. To define a variable group, include the GROUP keyword in the DEFINE command.
- TYPE Optional command for specifying the type of variable, where variable-type is either INTEGER or STRING. Also use to specify if the member or value of the variable should be retained when another database is activated.

A variable of type integer means that the value of the variable can only be an integer.

A variable of type string means that the value of the variable can be a string of character data. String is the default type.

- DEFAULT Sets the initial value of the variable.

Note: If a default value is not defined, the Message Processor uses a default of 0 for integer variables and a null string (" ") as the default for string variables.

- TIME-OUT Resets a variable to its default value if it has not been changed using the SET and RESET commands after a specified period of time. The time-unit may be specified as either MINUTES or SECONDS. SECONDS is the default time-unit.
- END Ends the definition block. There must be a corresponding END command for each preceding DEFINE command.

The names of user-defined variables are always case insensitive whether or not the database is case sensitive or case insensitive. For example, references to a variable name of DISKERRORS, diskerrors, and DISKerrors can be used to refer to a variable defined as DiskErrors.

Variable group members are the means for creating multiple values within user-defined variable groups. Members of the variable group are created or destroyed at run time. Each member has a permanent, descriptive name within its variable group. A member name can contain up to 128 characters including spaces; longer names are truncated. A member name must be unique within its variable group; however, the same member name may be used in multiple variable groups because members are always referenced with their variable group names.

Unlike variable names, case sensitivity of member names is consistent with the case sensitivity of the database. If the database is case sensitive, then the member names are created and matched exactly as they are named them in the pattern definition. If the database is case insensitive, the member names are created and matched using all uppercase letters.

When referencing user-defined variables, use the format:

\variable-ref\ where variable-ref is either a variable or a member of a variable group.

In the case of a member of a variable group, the member reference has the form:

variable-group:member-name where variable-group is the name of a user-defined variable group that the user defined previously.

member-name is the name of the member the user wants to reference. A member name can be a fixed string constant or the name of a variable.

To reference a member, both the member name and the name of its variable group must be specified. The name of a variable group member can be referenced by a variable or by a fixed string constant. Variable group member names have a maximum length of 128 characters; longer names are truncated.

A variable reference is the name of a user-defined or a predefined variable. A fixed string constant reference is a set of characters, in quotation marks (" "). Fixed string constants cannot include substitution. For example, "Disk" is a valid fixed string constant member name, but "Disk\Diskname\" is not.

The following example uses a fixed string constant to set a member named "DN" in the variable group DeviceStatus to a value of "down."

SET DeviceStatus:"DN"="down"

An equivalent reference uses a user-defined string variable, StatusName, as shown in this example.

SET StatusName="DN"

SET DeviceStatus:StatusName="down"

The following example references the same member, "DN", from the variable group DeviceStatus within a string. Notice that when referencing a variable group member within a string, both the group name and the member name must be enclosed within backslashes (\).

\Device\_TOKEN1\is\DeviceStatus:"DN"\

The above example is more meaningful if the member name is extracted from message text rather than from a fixed string constant.

For the following example, assume that the message text is "DAO DN". In this case, the second token from a message is used to reference the variable group member. This reference causes the device status of "DN" to become the more meaningful word, down.

"\Device\_TOKEN1\is\DeviceStatus:_TOKEN2\"

After text substitution occurs, the resulting string is:

"Device DAO is down."

In some cases, all of the members of a variable group may need to be referenced. To do this, the predefined variable called _ALL may be used.

The _ALL may be used with the following commands:

- DESTROY Destroys all members of the specified variable group.
- SET

Sets all members of the specified variable group to a common value.
- RESET

Resets all members of the specified variable group to the default value of that variable group.

The following example resets all of the members in the variable group called DiskErrors to their default value.

RESET DiskErrors:_ALL

The _ALL may also be used within an expression or string. The result of this reference is a string that includes all of the member names separated by two spaces.

The following example generates a string that contains all of the member names in the variable group called DiskErrors.

ACTION ALL DISPLAY "\DiskErrors:_ALL\"

If DiskErrors has three members named DISK01, DISK02, and DISK03, the resulting string would be:

"DISK01 DISK02 DISK03"

To reference a variable within a string, the value must be enclosed within backslashes (\). The following example shows how to reference the value of the variable DISKNAME in a string:

"The name of the disk is \DISKNAME\"

The following example shows how to reference the value of a variable group member within a string. Assume that the name of each member of the variable group, EXECErrorText, is actually an Exec error code (for example, 001 or 002). The value of each member is a text description of the Exec error code. For example, member 001 has a value of "facilities inventory complex error," and member 002 has a value of "function control error." The following example shows how to insert the text description of Exec error code 001 into a string.

"System error code 001 (\EXECErrorText:"001"\) occurred"

After substitution, the resulting string is:

"System error code 001 ( facilities inventory complex error) occurred"

Now assume that the error code is stored in a variable named ErrorCode. The following example shows how to generically reference the error code and Exec error code text.

"System error code \ErrorCode\(\EXECErrorText:ErrorCode\) occurred"

If ErrorCode has a value of 001, the results of the two example strings are identical. ErrorCode can be an integer or string variable; the results are the same in either case.

Backslashes (\) may be omitted when referencing variables within expressions. However, if a variable is being referenced within a string that is within an expression, or if partial text is being referenced, the reference must be enclosed in backslashes. The following example shows how to reference the values of variables called Count and DISKNAME in expressions.

```
SET Command = "UP\DISKNAME\"
SET Current    =DISKNAME
SET Count      =Count+1
```

User-defined variables can be referenced as the target of the SET, RESET, CREATE, and DESTROY actions. The following rules apply when using references as the target of these actions:

- The variable reference cannot consist of partial text.
- The reference cannot be enclosed within backslashes (\).
- Predefined variables cannot be referenced as the target of the command.

However, a predefined variable name can be used as the member reference of a variable group.

For example, assume that _TOKEN1 has the value of PRD10C. The value of PRD10C is used as the member name of the DiskErrors variable group. In this example, the member PRD10C is reset to its default value.

RESET DiskErrors:_TOKEN1

The following example shows how to reference the variable called DISKNAME. In this example, DISKNAME is set to the value of token 3.

SET DISKNAME="\TOKEN3\"

In this example, DISKNAME is the target of the SET command and therefore does not get enclosed in backslashes. _TOKEN3 is referenced as part of the string and therefore is enclosed in backslashes.

Partial text reference is used to extract only a portion of a variable value. Subtokens, character positions, or a combination of both may be extracted. The format for partial text reference is:

| |
|---|
| \identifier "list" subtoken\ |
| \identifier {set} subtoken\ |
| \identifier "list" subtoken [start,end]\ |
| \identifier {set} subtoken [start,end]\ |
| \identifier [start,end]\ | where identifier is a predefined variable, user-defined variable, token number (nn), or negative token number (−nn).

list is the optional delimiter list, within quotation marks (" "). The delimiters separate the token into subtokens.

set is the optional delimiter set, within braces ({ }). The delimiters separate the token into subtokens.

subtoken is an integer that indicates the portion of text to be referenced.

Subtokens are numbered left to right unless preceded by a minus sign (−); then the subtokens are numbered right to left.

start is an integer that indicates the starting character position within the inset (or subtext insert). Character position are numbered from left to right, starting at 1. The starting character position cannot be greater than the total number of characters of the insert.

end is an integer that indicates the ending character position within the insert (or subtext insert). The ending character position must be greater than or equal to the beginning character position. Character positions are numbered from left to right, starting at 1. If the ending character position is greater than the total number of insert characters, the last insert character position is used.

Subtoken substitution is used to break apart or tokenize the substitution text into subtokens. For example, assume the following device error message is pattern matched using the standard delimiters (blanks).

| |
|---|
| device ip/iop/cm/cu DEVERR function run-id responses |
| Token 1 = device |
| Token 2 = ip/iop/cm/cu |
| Token 3 = DEVERR |
| Token 4 = function |
| Token 5 = run-id |
| Token 6 = responses |

The following subtext specification extracts the instruction processor name (ip) from the second token:

\_TOKEN2 {/}1\

An alternate way of specifying the second token is:

\2{/}1\

The identifier is the second token: ipliop/cmlcu, which results in the following subtokens:

| |
|---|
| Subtokens 1 = ip |
| Subtokens 2 = iop |
| Subtokens 3 = cm |
| Subtokens 4 = cu |

When the delimiter of / is used, the subtoken specification (1) extracts ip from the substitution text. Note that negative token numbering can also be used with subtoken substitution.

The following example shows how to reference part of the text value of a member of a variable group. The substring [1,4] is applied to the value of the variable group member referenced by DiskName:\_token3.

DiskName:\_token3 [1,4]\

The following example shows how to reference the first five characters from the third token of MESSAGE:

\MESSAGE { }3[1,5]\

Notice that in this example, MESSAGE, a predefined variable does not begin with the underscore (\_) character.

Character position substitution is used to extract particular character positions within a text substitution. Specify the starting and ending characters, separated by a comma. The following example extracts the third and fourth characters from the "MMDDYYHHMMSS" date substitution:

\DT[3,4]\

As a result, only the DD portion of the date is substituted into the action text.

If only one character is desired, specify the start and end characters as the same:

\DT[6,6]\

As a result, only the last digit of the year is substituted into the action text.

The starting character position must be less than or equal to the total number of characters, and the ending position can be greater than the total number of characters. For example, if [20,40] is used to extract part of a message that is 30 characters long, characters 20 through 30 are extracted. However if [41,50] is specified, an error occurs because the starting character position is greater than the total number of characters. The \_STATUS predefined variable is set to –1 in this case.

A partial text reference can combine subtoken and character position substitution. For example, assume the following device error message is pattern-matched using the standard delimiters (blanks):

device ip/iop/cm/cu DEVERR function run-id responses

The following subtoken substitution combined with character position substitution, extracts only the first three characters of the jop name:

\2{/}2[1,3]\

The following example shows how to reference the fourth and fifth characters of the second token of the member of the variable group ErrorText named by the third token in the matched message. In this example, the backslashes are required because a partial text reference is used.

\ErrorText:\_token3{ }2[4,5]\

This reference is part of a pattern that matches the following message:

Operator: Enter E002 most recent bag number.

The value of \_token3 is E002. Within the variable group (ErrorText), there is a member called E002. If the value of E002 is undefined bag65, then 6 and 5 are the fourth and fifth characters of the second subtoken (bag65).

The following example shows how to reference the fourth and fifth characters of the third subtoken of the variable called ErrorText in a string.

"The error code is \ErrorText{ }3[4,5]\"

The value of a user-defined variable can be changed to its default value or to a new value by including the SET and RESET actions in the Pattern Database. The SET and RESET commands are executed during action processing.

To change the value of a variable group member, the variable group and the member name to be changed must be specified. If a member name that does not exist is specified, it is dynamically created with the new value. The value of all of the members of a variable group can be changed to a default value or to a new value by referencing the predefined variable, \_ALL, that includes all of the members. Expressions are a series of operands and operators whose computation yields a value. Spaces between operands and operators are permitted but are not required. If an expression cannot fit on one line, a backslash (\) must be inserted at the end of the first line to continue the expression to the next line. If the backslash is not included, the lines will be treated as two separate expressions and an error is likely to occur. In the Message Processor, operands are:

- Integer constants Integer constants are numbers ranging from –32676 to 32676
- Strings There are two kinds of strings: fixed string constants and strings with substitution.
    Fixed string constants are enclosed in quotation marks and contain characters only. Text cannot be substituted into a fixed string constant.
    Strings with substitution are enclosed in quotation marks and can contain characters and variable references that are inserted into the string. Masking sequences (\?n and \*n\) are not allowed.
- Variable references Variable references can be used to reference message tokens, predefined variables, user-defined variables, members of variable groups, and partial text references of any variable.

- Expressions within parentheses ( ) An expression can be enclosed in parentheses to control the order of evaluation. For example, in the expression (A+B)*C A and B are first added together and their sum is multiplied by C. Without the parentheses, the expression

A+B*C would be evaluated by multiplying B and C and adding the result to A, since multiplication has precedence over addition.

In the Message Processor, operators are

- Arithmetic Arithmetic operators operate on integer constants, integer variables, and integer expressions.
- Comparison Binary comparison operators compare two integer operands or two strings. The result of a comparison operator is zero if the condition is false and is non-zero if the condition is true. The unary comparison operator (?) can be used to check for the existence of a member in a variable group.
- Boolean Boolean operators perform the following logical operations.
  Logical AND (&)
  Logical OR(|)
  Unary NOT(!)
  The result of a Boolean operator is zero if the result is false and is non-zero if the result is true.
- Conversion The unary uppercase operator, ^, and be applied to string operands to convert the text "a" through "z" to uppercase characters. The # symbol converts string operands to integers.

Integer operands within quotation marks (" ") are converted to strings.

The following are the Message Monitor supported operators:

| Operator | Action |
| --- | --- |
| − | Unary negation |
| + | Unary positive |
| ! | Unary NOT |
| ? | Test for the existence of a member in a variable group |
| # | Converts string operand to integer operands |
| ^ | Converts string operands to upper case |
| * | Multiplication |
| / | Integer division |
| % | Integer remainder |
| + | Addition |
| − | Subtraction |
| < | Relational less than |
| > | Relational greater than |
| <= | Less than or equal to |
| >= | Greater than or equal to |
| = | Equal to |
| != | Not equal to |
| & | Logical AND |
| | | Logical OR |

The following are conditions for using comparison operators in strings:

- Masking is not allowed in fixed string constants.
- Strings must be in the same case in order to match. The ^ operator can be used to change the case, if necessary.
- Leading and trailing spaces are included in string comparisons. For example "AB" does not match "AB".

The following list shows the precedence of the operators. The list is in sequence of highest to lowest precedence. Where several operators are grouped, they have equal precedence to each other and are evaluated from left to right. To change the order of precedence, operands and operators can be enclosed within parentheses ( ).

| Evaluation Sequence | Operators |
| --- | --- |
| Evaluated first | −(unary) ! ? # ^ + (unary) |
| Evaluated second | * / % |
| Evaluated third | +(binary) −(binary) |
| Evaluated fourth | < > <= >= |
| Evaluated fifth | = != |
| Evaluated sixth | & |
| Evaluated last | | |

The existence operator (?) applies only to references of variable group members. An error occurs if this operator is applied to any other operand. The existence operator may be used to check for the existence of any members in a variable group. In addition, if __ALL is used to refer to all of the members in the variable group, evaluation of "?" results in the number of members in the group.

The following example shows how to use the existence operator. In the example

?MacroKeyins:__TOKEN1 the statement yields true if the value of the first message token is a member of the variable group MacroKeyins. Otherwise, it yields false.

If MacroKeyins is a variable group whose members are SP* and RE*, the following constraint:

CONSTRAINT (?MacroKeyins:__TOKEN1)

allows message to match only if they begin with "SP*" or "RE*."

The following example results in the count of the existing members of MacroKeyins.

?MacroKeyins:__ALL

Response definitions are specified as input to the Create Pattern Database software 42 through use of the ACTION command for specification of automation functions and function decisions that are used for conditioning performance of the functions. Actions can be executed in three ways:

- They can be included in the ACTION command to automate responses to system messages and display or suppress system information to the operator.
- They can be specified to change the values of user-defined variables.
- They can be associated with function decisions for execution of actions that depends on information from more than one message.

The ACTION command allows specification of the actions the Message Processor should perform when it finds a pattern match for a input message. Any number of actions may be specified per pattern. The format of the ACTION command is:

ACTION mode [mode . . .]action-type "action-text" [WAIT xxx [time-unit]]

The mode is the mode to which the action applies. These modes are unique to 2200 Series data processing systems and beyond the scope of the present invention.

The action-type is the type of action the Message Processor should initiate. There are two types of actions: automation actions and display enhancement actions.

- Automation actions
  ACTIVATE
  ALARM
  ANSWER
  COMMAND
  DEACTIVATE
  EVENT-REPORT
  RESPONSE
  TCOMMAND
- Display enhancement actions
  DISPLAY
  HIGHLIGHT
  HOLD
  RELEASE
  SUPPRESS The particular functions are unique to 2200 Series data processing systems and beyond the scope of the present invention. However, the finctions will be further described as examples of functions whose initiation could be automated as a responses to messages that match defined patterns.

The action-text is any predefined or user-defined variable whose length does not exceed a predetermined maximum length. If the length of a substituted variable exceeds the maximum length, or the text is inappropriate for the action type, a run-time error can occur.

When the Message Processor creates action text from substituted variables, the generated text length cannot be determined until execution time. Substitution of all predefined variables adds 1 character to the length of the generated text, except for the following variables:

- _DT adds 13 characters
- _RRID adds 8 characters
- _DAY adds 6 characters

Partial text references add the end-position—start-position +1. This overrides the previous length calculations for this particular substitution.

WAIT xxx [time-unit]

xxx is an integer (minimum of 1 and maximum of 32767) that indicates the number of seconds or minutes to wait before performing the specified action. It must be specified as an integer constant; a variable reference is not allowed.

time-unit is either SECONDS or MINUSES. SECONDS is the default if neither is specified.

The WAIT clause can be used to delay the execution of automation actions for a specified number of minutes or seconds. The WAIT clause cannot be used with display enhancement actions nor with the SET, RESET, CREATE, and DESTROY actions.

Delayed actions are:

- Generated and then saved until the specified number of seconds or minutes have elapsed.
- Executed once the specified time has elapsed. When WAIT is used with ACTIVATE and DEACTIVATE, the specified database is activated or deactivated after the elapsed amount of time. If an operator activates another database between the time that the ACTIVATE or DEACIWVATE action is generated and executed, the database that is activated as a result of the delayed action takes effect at the specified time.
- Executed if no database is active at the time that the specified number of seconds or minutes has elapsed.
- Not executed if the system operations session loses its connection to the Host or terminates and restarts, or if the console is rebooted.

The automation actions that can be defined using the ACTION command are described in the following paragraphs.

The ACTIVATE action activates a Pattern Database. The database name is supplied for the action text. Activation failure causes the previously active database to remain active.

The ALARM action activates an alarm. The action text is the alarm identifier (a value of 0 through 18, or 33).

The ANSWER action automatically answers an outstanding read-and-reply message. The matching message or variable indicates which outstanding read-and-reply message to answer. The action text consist of the response number indicator followed by the text of the response.

ACTION mode ANSWER "\rridnol\-response"

where mode is one of the following: ATTENDED, CASUAL, UNATTENDED, ALL

\rridno\is the response number, which can be the token position of the read-and-reply identifier in the defined message, a variable, or a member of a variable group.

response is the text used to answer the read-and-reply message indicated by the RRID.

The response text can use variable and token substitution, and can be up to 68 characters long. It does not include the leading response number and data.

The COMMAND action generates an unsolicited console key-in. The action text is the text of the key-in.

The DEACTIVATE action deactivates the current active database. Once a database is deactivated, operator intervention is required to activate it. Action text is not specified. Only one DEACTIVATE or ACTIVATE action is allowed per mode. It is executed after all other specified actions have executed.

The EVENT REPORT action can be used to communicate with other Software processes that a pattern was matched.

The RESPONSE action responds to a read-and-reply message.

The TCOMMAND action generates an unsolicited console key-in but does not display it on the system console. This action functions like the COMMAND action. The action text is the text of the key-in. The transparent command is used to send commands without distracting the operator.

Display enhancement actions are available for the Automated Operation Console. The display enhancement actions include DISPLAY, HIGHLIGHT, HOLD, RELEASE, and SUPPRESS.

The DISPLAY action displays the text as specified by the action text on the display of the Automated Operation Console. This action can be used in combination with the Suppress action to perform message replacement.

The HIGHLIGHT action attaches a display attribute to a received message. In addition, supplemental messages are highlighted when the Display command is used. The display attributes include background and foreground colors.

The HOLD action prevents a received message from scrolling off the Automated Operation Console display screen. The message may be released by the Release action. This action may be used in combination with the Display action.

The RELEASE action automatically removes held messages. The action text is a 1-12 character identifier specified on a Hold action.

The SUPPRESS action prevents a received message from being displayed on the display screen of the Automated Operation Console.

The following functions can be executed to create and destroy members of user-defined variable groups, and to set and reset variables and members of variable groups.

The CREATE action creates a member of a variable group. The format of the CREATE action is:

CREATE variable-group-name:member-name where variable-group-name is the name of a previously defined variable group.

member-name is the unique name of the member. The member name can be a variable or a fixed string constant but cannot be a reference to another variable group member. A fixed string constant is a set of characters enclosed in quotation marks (for example, "ABC") and cannot include variable substitution (for example, "FROM \_RUNID\").

If the CREATE action is used to create a member that already exists, the value of the member and the TIME-OUT value do not change, and the _STATUS variable is set to 1, indicating a warning.

The following example adds a member named "SYS" to the variable group called RunidList. "SYS" is a fixed string constant.

CREATE RunidList:"SYS"

The following example shows how to create a member called PRD0IC, when PRD0IC is the value of the variable called disk, in the previously defined variable group called DiskErrors. The value (PRD0IC) of the variable (disk) is used to name the member.

CREATE DiskErrors:disk

The following example shows how to use a predefined variable as a member of a user-defined variable group. The value of the predefined variable, _RUNID, names a member of the user-defined variable group called RunidList.

CREATE RunidList:_RUNID

The following example shows how to create a member in the user-defined variable group called Status. The name of the member is the value of the fifth token. If the fifth message token is RESERVED, this command creates the member RESERVED in the variable group Status.

CREATE Status:_TOKEN5

An alternative way to reference _TOKENS is to use the number of the token, as shown in this example:

CREATE Status:5

The DESTROY action destroys a member that was created in a user-defined variable group. The DESTROY actin can be used to delete one or all members that were created for a given variable group. The format for the DESTROY action is:

DESTROY variable-group-name:member-name where variable-group-name is the name of a previously defined variable group.

member-name is the unique name of the member. The member name can be a variable, a fixed string constant, or the predefined variable _ALL. A fixed string constant is a set of characters enclosed in quotation marks (for example, "ABC") and cannot include variable substitution (for example, "FROM\_RUNID\"). _ALL references all of the members of a previously defined variable group.

If the DESTROY action is used to delete a member that does not exist, the _STATUS variable is set to 1, indicating a warning. if the DESTROY action is used to delete all (_ALL) members of a variable group that has no members, the _STATUS variable is set to -1, indicating an error. The _STATUS variable is also set to -1 if the member name is a token that does not exist.

The following example shows how to delete the member from the user-defined variable group called DiskErrors. The member that wil be deleted is named by the value of the variable called disk. If the variable, disk, has the value PRD0IC, the member named PRDO C in variable group DiskErrors is destroyed.

DESTROY DiskError:disk

The following example shows how to delete the members named "SYS" from the variable group called RunidList. "SYS" is a sting literal.

DESTROY RunidList:"SYS"

The following example shows how to delete all of the members from the user-defined variable group called Disk:Errors.

DESTROY DiskError:_ALL

The SET action sets the value of a variable, or one or all members of a variable group. Variable group members are automatically created if they do not exist when a value is assigned using the SET action. The format of the SET action is:

SET target=expression where target is a variable or variable group member reference of the form variable group:member-name.

expression is the value to assign to the variable or member in the form of either an expression, or a fixed string constant. Fixed string constants must be enclosed in quotation marks (") and can contain characters and variable references that are inserted into the string.

The following example shows how to set the value of the variable called DiskMessage. The value of DiskNumber is inserted into the string before it is assigned to DiskMessage.

SET DiskMessage="The number of the disk is \DiskNumber\"

Assume that _TOKEN1 has the value of PRDO1C. The following example shows how to add 1 to the value of the member named PRD01C. If PRD01C is not yet a member of variable group DiskErrors, it is automatically created when it is referenced by the SET action. The right side of the equation is evaluated by using the default value for members of variable group DiskErrors and adding 1 to that value.

```
SET DiskErrors:_TOKEN1=DiskErrors:_TOKEN1+1
```

Assume that _TOKEN1 has the value of PRD10C and that _TOKEN2 has the value of DISK01. The following example shows the value of PRD10C being set to the value of DISK01 incremented by 1.

```
SET DiskErrors:_TOKEN1=DiskErrors:_TOKEN2+1
```

If member PRD10C does not exist, it is automatically created and assigned the value resulting from the right side of the equation. However, if member DISK01 does not exist, an error message results. THE MESSAGE PROCESSOR does not automatically create members that are referenced in an expression. Members are created when referenced as a target of a SET or RESET command.

The following example shows how to set the value of a member using a variable (StatusName) as a member name reference, in the variable group called DeviceStatus.

```
SET StatusName="DN"

SET DeviceStatus:StatusName="Down"
```

Alternatively, the member name can be referenced directly as:

```
SET DeviceStatus:"DN"="Down"
```

The RESET action resets the value of one or all members of a user-defined variable to the default value. Variable group members are automatically created if they do not exist when referenced by the RESET action. The format for the RESET action is:

```
RESET target
``` where target is a variable or variable group member reference of the form variablegroup:member-name The following example shows how to reset the string variable called DiskMessage to the default value when the variable was defined.

```
RESET DiskMessage
```

The following example shows how to reset all of the members in the variable group called DiskErrors to the default value specified when the variable group was defined.

```
RESET DiskErrors:_ALL
```

Function decisions

Decisions can be applied to action processing in a Pattern Database using the IF-ELSEIF-ELSE-ENDIF construction. Nested IF statements permit definition of multiple sets of conditions and associated actions in the database.

The IF-ELSEIF-ELSE-ENDIF construction consists of conditional clauses in the database that use expressions to determine when to execute an action. The construction is flexible and allows the definitions of actions that should occur if certain conditions are true or not true. The format of the IF-ELSEIF-ELSE-ENDIF action is:

```
IF expression
    [actions]
ELSEIF expression
    [actions]
ELSE
    [actions]
ENDIF
```

IF indicates the beginning of the function decision. The expression is required; the actions are optional.

expression is a set of conditions that result in a non-zero integer value for the specified actions to occur.

actions are any of the following:
- All keywords of the ACTION command
- SET action
- RESET action
- CREATE action
- DESTROY action
- A nested IF-ELSEIF-ELSE-ENDIF construction ELSEIF Is an optional clause that introduces a set of conditions that are checked if conditions from the IF clause are false. If the ELSEIF conditions are true, another set of actions are executed. Multiple ELSEIF clauses can be specified for an IF construction.

ELSE Is an optional clause that introduces a set of actions that occur if none of the preceding conditions in the IF and ELSEIF clauses are true.

ENDIF Indicates the end of the IF-ELSEIF-ELSE-ENDIF construction. Nested IF constructions provide the ability to specify any number of conditions that must be true for action processing to occur. When IF constructions are nested, each one must have its own ENDIF clause. IF constructions and be nested up to 32 levels deep.

The END command indicates the end of a pattern definition. There must be a corresponding END command for each DEFINE command preceding it. The format of the END command is: END The follow is a complete example of a pattern definition:

```
DEFINE "newplant" 20
    MESSAGE "IS TAPE ON unit# A LABELED TAPE Y,N,REEL"
    TYPE READ-AND-REPLY PRIVILEGED-EXEC
    PRIORITY 120
    DELIMITERS {,}
    TOKEN 6 FIXED
    TOKEN 2
    TOKEN MASKED 4 "TAO\?1\"
    ACTION CASUAL RESPONSE "N"
    ACTION ATTENDED RESPONSE "N"
END
```

The Create Pattern Database software 42 creates a pattern with the message number 20 in group-id newplant, and enters it into the Pattern Database 44.

The following examples show how to include function decisions in a Pattern Database to automate actions and respond to system messages in typical applications.

The following example shows how to use the Message Processor 50 and a Pattern Database 44 to execute an action on a message only when it is the first time the message has been matched. After the message has been matched, the pattern is disabled.

```
/* Define a variable to indicate if the pattern is enabled or disabled */
DEFINE VARIABLE "X1_on"
    TYPE   INTEGER
    DEFAULT 1   /* 1 indicated the pattern is enabled (active) */
END
DEFINE "X" 1
    MESSAGE "message text . . ."
    TOKEN . . .
    .
    .
    CONSTRAINT (X1_on) /* Pattern only matches if X1_on is non-zero */
    ACTION ALL . . .
    .
    .
    SET X1_on = 0   /* Turns pattern off after actions are executed */
```

The pattern defined as "X" 1 can be enabled again by another pattern by resetting the X1_on variable.

Returning to FIG. 3, after the input has been defined in accordance with the rules above, the Create Pattern Database software 42 creates the appropriate pattern definitions in the Pattern Database 44 as shown by Step 74. The Pattern Database consists of the specified number of pattern definitions, specified ones including pattern decisions, along with associated response definitions. The response definitions include one or more functions along with optional function decisions.

In corresponding to the exemplary embodiment, the pattern definitions may be specified with the TYPE, DELIMIERS, TOKEN, and CONSTRAINT commands; the response definitions may be specified with the ACTION commands in combination with the function decisions; and the function decisions may be specified with the IF, ELSE-IF, and ELSE logic. The function definitions may be specified with the ACTION commands and the variable manipulation functions (e.g., SET and RESET).

Also in the exemplary embodiment, the functions specified by the function definition are of two types relative to the Message Processor 50, internal and external. Internal function are those which affect the variables defined in the database, and external function identify a function of processor that is external to the Message Processor (e.g., a power control unit or a status monitor program on another computer).

Data structures of the exemplary embodiment correspond to the VARIABLES, both predefined and user-defined.

After the Pattern Database 44 has been created and established for use by the Message Processor 50 (e.g., on the Automated Operation Console), at Step 76 the Message Processor opens the Pattern Database for use in processing input messages. The flowchart of Open Database For Pattern Matching may be consulted for further details.

After the Pattern Database 44 has been opened, the Message Processor 50 enters a processing loop for receiving and processing messages. A message is received at Step 78 according to methods and protocols specific to the Console 12/Host 10 interface. The particular means by which messages are received for processing should not be seen as limiting the present invention. For example, messages could be input via standard or proprietary networks or shared memory.

Step 80 searches the Pattern Database 50 for a pattern definition that matches a received message. The Search Processing flowchart further describes this step. If the message matches a pattern definition, decision step 82 directs control to Step 84. Otherwise, control is returned to Step 78 to receive the next message for processing.

Step 84 interprets the response definition that is associated with the matching pattern definition identified in Step 80. Interpretation of the response definition includes obtaining and interpreting the decision and function definitions that comprise the response definition.

FIG. 4 shows example input for creating a Pattern Database 50. The sample input consists of a single Pattern definition 102, a Response definition 104 that is made up of a Function decision 106 and Function definitions 108. The example input also includes three Data structures 110 and a Pattern decision 112.

This example shows how to use function decisions to sense and respond to a cache error. It implements a site policy of answering the first of each sequence of error messages with "M", "A" up to three times, and finally "G." If ten minutes elapses between errors, the next error message begins a new sequence. Each variable in the group is a device and path name. The value of each variable indicates the number of errors within the time-out period, as follows:

- −1 There are no current errors, but at least one error occurred in the past.
- 0 This is the first error within the time-out period defined. The Message Is Answered By M, And Diagnostic Information Is Sent To The Console Log. The Exec sends the message again with the additional information.
- 1 This is the first error within the time-out period defined, the message has reappeared after the response of M. It is answered by A.
- 2 or 3 This is the second or third occurrence of the error within the time-out period defined. The second and third occurrences are answered by A.
- 4 This is the fourth occurrence of the error within the time-out period defined. It is answered by G, and the variable group member is destroyed.

Note that if more than ten minutes has elapsed since Cache_Error_Count has changed, the error count is reset to default value of −1.

The message has either a run-id or EXEC 8, making its total length either six or seven tokens. VARIABLE-LENGTH on the TYPE clause allows the message to match patterns of variable token lengths.

One RESPONSE action is permitted per mode. Function decisions are used to specify conditions for setting or destroying the variable group member.

To ensure that the automated response is timed so that the system is ready to receive it, the WAIT clause can be added to the RESPONSE action. Waiting five seconds allows more time for the I/O system to settle down before the Message Processor initiates the automated response.

ACTION ALL RESPONSE \"Response\" WAIT 5

Figure 5:
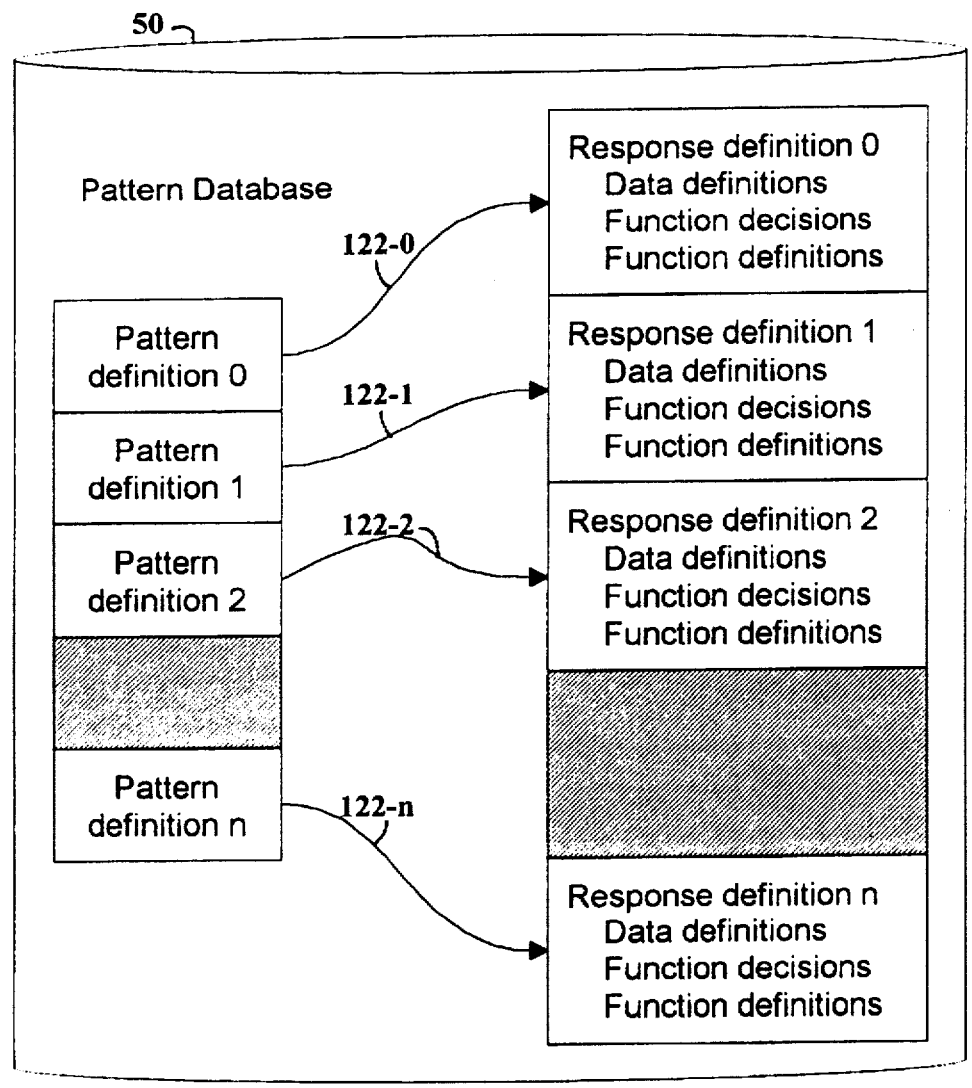
FIG. 5 illustrates the logical layout of the Pattern Database.

FIG. 5 illustrates the logical layout of the Pattern Database 44. The Pattern definitions, 0-n, respectively reference associated Action definitions 0-n. Each of the action definitions includes function definitions and optional decision and data definitions.

When a message arrives, the pattern definitions are searched for a pattern definition that matches the message. If a matching pattern definition is located, its associated response definition is read from the Pattern Database. In persistent storage (e.g., a hard disk drive on the Automated Operation Console 12), the pattern definition references an associated response definition via file relative addressing. The references are shown as Lines 122-0–122-n. When loaded into the memory of the Console 12, the associations exist as memory addresses.

Figure 6:
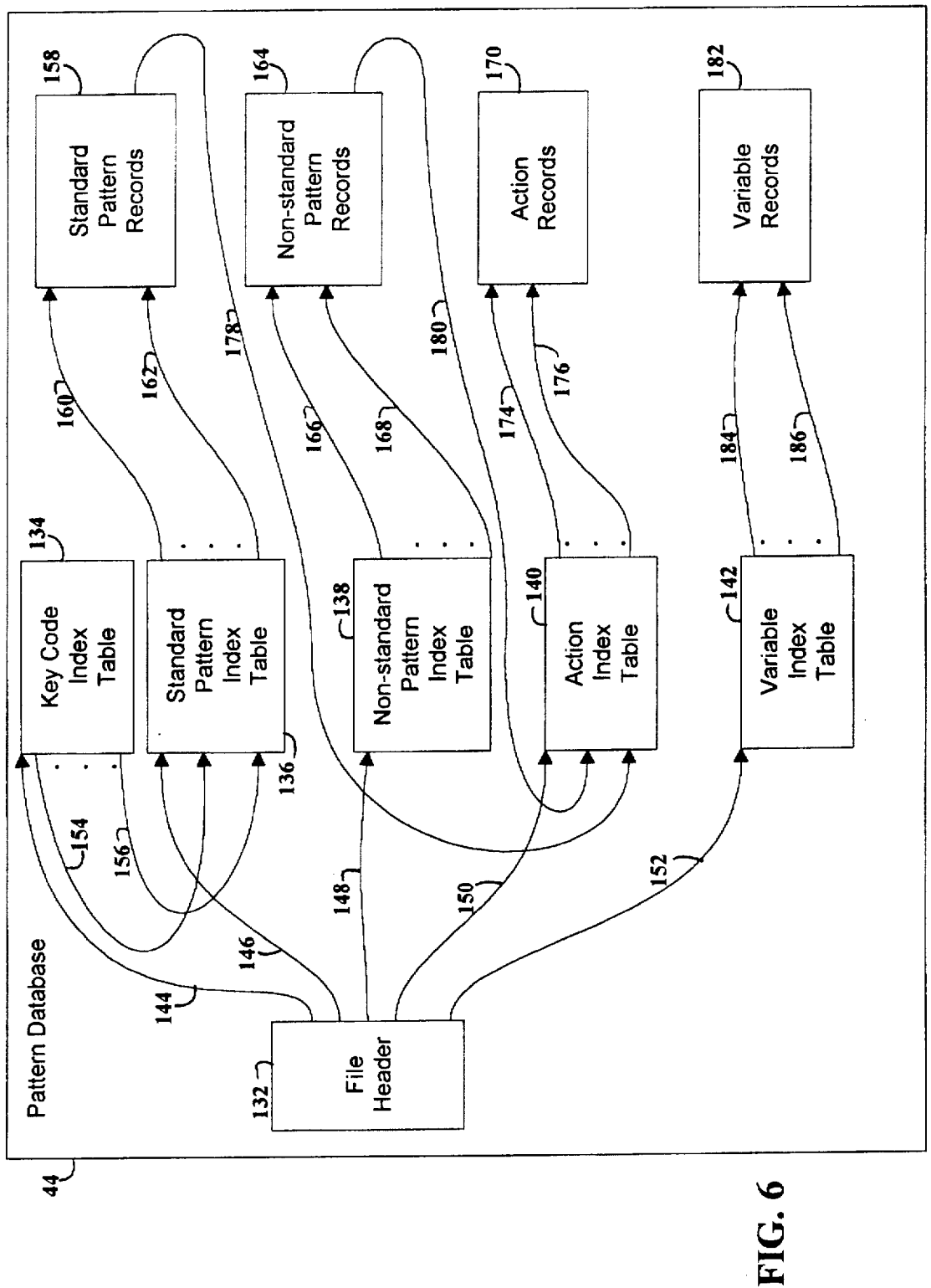
FIG. 6 is a block diagram that illustrates the format of the Pattern Database.

FIG. 6 is a block diagram that illustrates the format of the Pattern Database 44. The Pattern Database consists of a single file with multiple index tables and record tables. The File Header 132 is used to reference the various index tables, which in turn are used to reference the various record tables. The various index tables are used to reference records for pattern matching, interpreting response definitions, and initiating the appropriate functions.

There are five main index tables that are used to implement the present invention. The Key Code Index Table 134, the Standard Pattern Index Table 136, the Non-standard Pattern Index Table 138, the Action Index Table 140, and the Variable Index Table 142. Entries in the File Header respectively reference the file relative address of each of the Index Tables 134-142 as shown by Lines 144, 146, 148, 150, and 152.

The Key Code Index Table 134 is used for fast lookup of keywords at a particular token position. Each key code corresponds to a standard pattern, but does not contain information about the memory or file location of the record containing the pattern definition ("pattern record" for short). Entries in the Key Code Index Table are is used for referencing the entries in the Standard Pattern Index Table 136 as shown by Lines 154 and 156.

The entries in the Standard Pattern Index Table 136 are used to reference pattern definitions that are contained in the Standard Pattern Records 158 for the purpose of searching for a pattern definition that matches an input message. The references to the Standard Pattern Records are shown as Lines 160-162.

The entries in the Non-standard Pattern Index Table 138 are used to reference pattern definitions that are contained in the Non-standard Pattern Records 164 for the purpose of searching for a pattern definition that matches an input message. The references to the Non-standard Pattern Records are shown as Lines 166-168.

The entries in the Action Index Table 140 are used to reference response definitions that are associated with pattern definitions and are contained in the Action Records 170. The references to the Action Records are shown as Lines 174-176. Fields in the Standard Pattern Records 158 and Non-standard Pattern Records 164 reference entries in the Action Index Table as illustrated by Lines 178 and 180.

The Variable Index Table 142 is used to reference the data definitions that are defined in the Variable Records 182. The references are illustrated as Lines 184 and 186.

Figure 7:
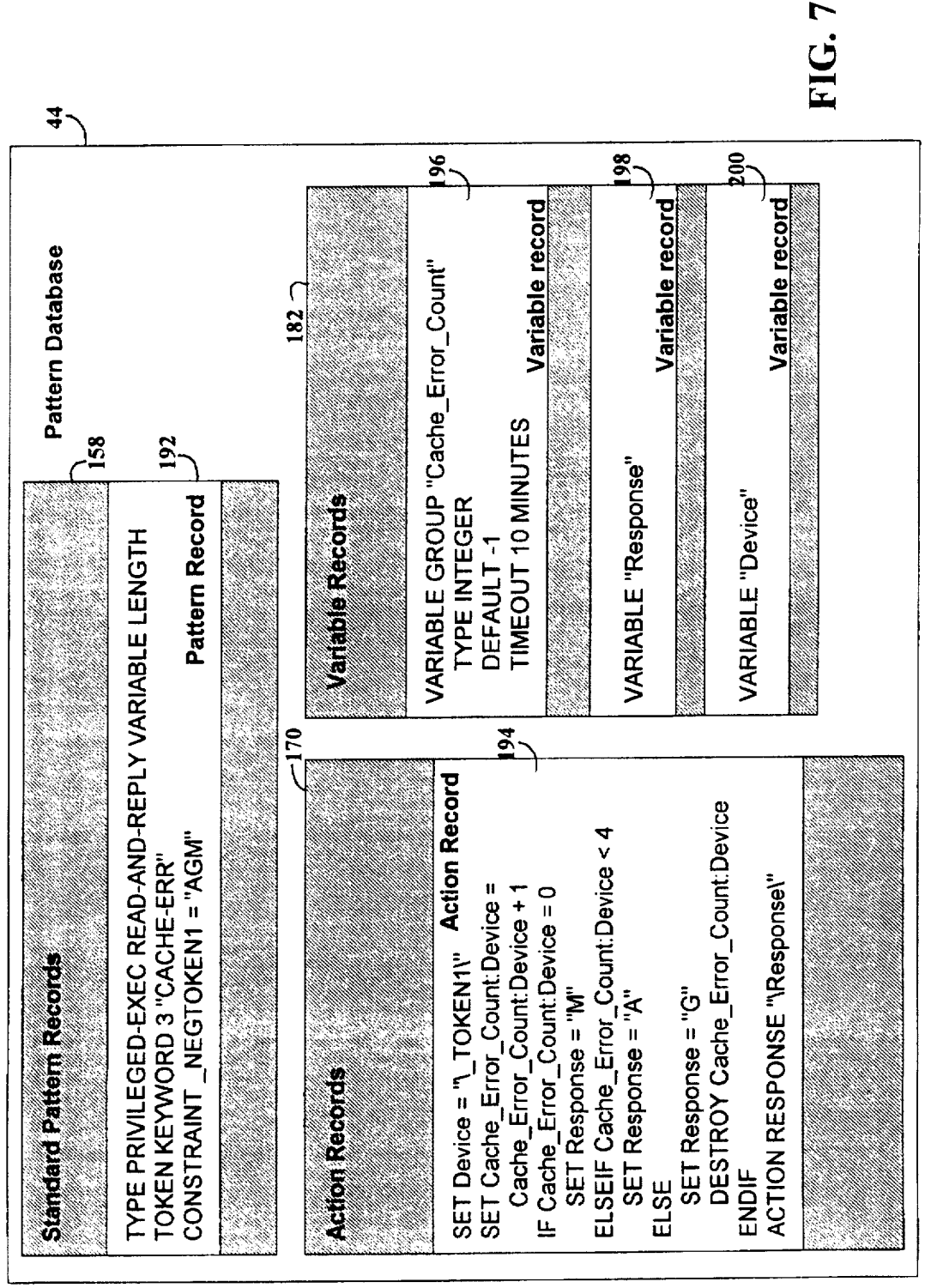
FIG. 7 pictorially illustrates the content of the Pattern Database having the example pattern definition of FIG. 4.

FIG. 7 pictorially illustrates the content of the Pattern Database 44 having the example pattern definition of FIG. 4. The pattern definition is set forth in a Pattern Record 192.

The Action Record 194 contains the response definition and the Variable Records 196, 198, and 200 contain the data definitions for the respective variables.

Figure 8:
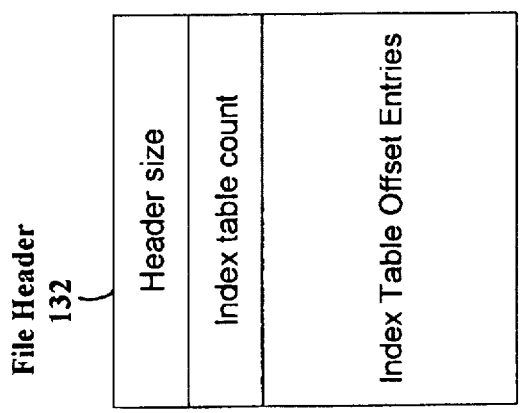
FIG. 8 illustrates the content of the File Header.

FIG. 8 illustrates the content of the File Header 132. The fields in the File Header are defined as follows:

| | |
|---|---|
| Header size | The actual size of the File Header. |
| Index table count | The number of index tables referenced by the File Header. |
| Index Table Offset Entries | The file relative address offsets of the respective index tables referenced by the Index table Offset Entries. |

Figure 9:
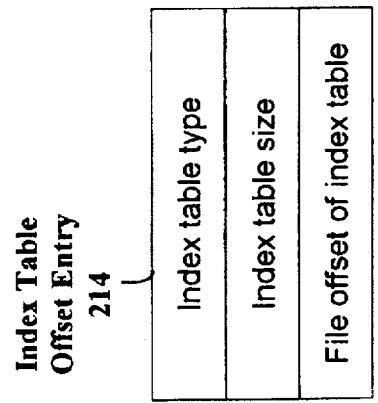
FIG. 9 illustrates the content of an Index Table Offset Entry.

FIG. 9 illustrates the content of an Index Table Offset Entry 214. The fields in an Index Table Offset Entry are defined as follows:

| | |
|---|---|
| Index table type | 0 for Standard pattern Index Table |
| | 1 for Non-standard Pattern Index Table |
| | 2 for Action Index Table |
| | 3 for Group Index Table |
| | 5 for Key Code Index Table |
| | 10 for Variable Index Table |
| | Note that other values are used for other types of tables that are beyond the scope of the present invention. |
| Index table size | The size of the respective index table. |
| Index table offset | The file relative address of the respective index table |

Figure 10:
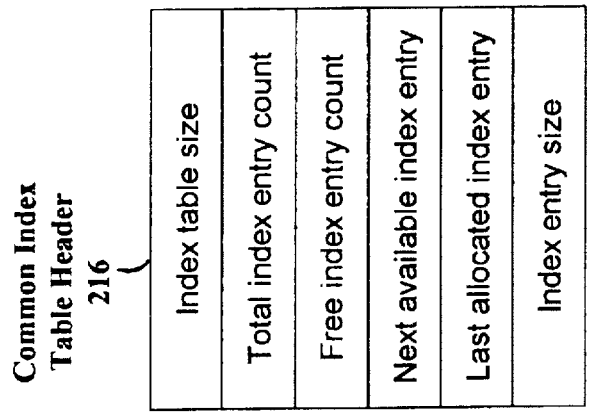
FIG. 10 illustrates the content of the Common Index Table Header.

FIG. 10 illustrates the content of the Common Index Table Header 216. The information of the Common Index Table Header is used in each of the index files. The fields in a Common Index Table Header are defined as follows:

| | |
|---|---|
| Index table size | The size of the index table |
| Total index entry count | The total number of index entries in the table, used and unused. |
| Free index entry count | The number of unused index entries. |
| Next available index entry | The index into the index table of the next unused index entry. |
| Last allocated index entry | The highest index into the index table of the used index entries. |
| Index entry size | The size of an index entry. |

FIG. 11 shows the content of the Key Code Index Table 134. The Key Code Index Table is used for fast lookup of keywords at a particular token position. Each key code corresponds to a standard pattern, but does not contain information about the memory or file location of the pattern object. The Standard Pattern Index Table contains the file and memory information.

The Key Code Index Table includes a Common Index Table Header 216 and Key Code Index Entries 218. The number of Key Code Index entries depends on the number of patterns with keywords that have been defined by the user. The Key Code Index Entries are sorted such that all entries with common characteristics are in sequential order or "chained" together.

FIG. 12 shows the content of a Key Code Index Entry 218. The fields in a Key Code Index Entry are defined as follows:

| | |
|---|---|
| Flags | 0x80 indicates that the index entry is in use. Note that the "0x" prefix is hexadecimal notation. |
| | 0x40 indicates that the index entry has been updated and needs to be written to persistent storage. This is normally used when updating a Pattern Database 50 with the Create Pattern Database software 42. |
| | 0x08 indicates the last key code index entry in the chain. This flag is used as an indicator that a Key Code Index Entry is at the end of a chain. |
| Priority | The relative pattern priority that is used as a sort key when determining the order to search patterns. |
| Key position | The Keyword token position. |
| Key length | The Keyword token length. |
| Key Code | The keyword token key code value that is calculated from the keyword text and is used for fast keyword comparison. |
| First index | The first index in the Key Code Index Table that is associated with this key code at this position. This field references the first entry in the chain of index entries with similar characteristics. |
| Pattern-ID | The Pattern-ID of the associated standard pattern. An identifier which includes the index number of the pattern record associated with this key index. |

FIGS. 13 and 14 respectively illustrate the content of the Standard Pattern Index Table 136 and the Non-standard Pattern Index Table 138. The Pattern Index Tables are used to reference pattern definitions that are contained in the Pattern Records for the purpose of searching for a pattern definition that matches an input message.

Both the Standard Pattern Index Table and the Non-standard Pattern Index Table include a Common Index Table Header and a number of Pattern Index Entries. The Pattern Index Entries are used to reference the Pattern Records. The number of Pattern Index Entries depends upon the number of patterns defined.

FIG. 15 illustrates the content of a Pattern Index Entry 220. The fields in a Pattern Index Entry are defined as follows:

| Flags | 0x80 indicates that the index entry is in use. Note that the "0x" prefix is hexadecimal notation. |
| --- | --- |
| | 0x40 indicates that the index entry has been updated and needs to be written to persistent storage. This is normally used when updating a Pattern Database 50 with the Create Pattern Database software 42. |
| | 0x02 indicates that the pattern has a CONSTRAINT definition. |
| Pattern size | The size of the associated pattern record. |
| Pattern file offset | The file relative address of the associated pattern record. |
| Pattern memory offset | The memory address of the associated pattern record. Memory offsets are used during the process of searching for pattern definitions that match a message. |
| Priority | The relative pattern priority. |
| Pattern-ID link | For standard patterns, the Pattern-ID of the associated key code index. For non-standard patterns, the Pattern-ID of the next pattern in the search order. Non-standard patterns are searched in a strict priority order. Non-standard patterns are linked together from one pattern in the search order to the next by the Pattern-ID link. |

FIG. 16 shows the content of the Action Index Table 140. The Action Index Table is used to reference response definitions that are associated with the defined patterns. The Action Index Table includes a Common Index Table Header and a number of Action Index Entries. The number of Action Index Entries is dependent upon the number of defined patterns.

FIG. 17 shows the content of an Action Index Entry 222. An Action Index Entry references a response definition that is stored in one of the Action Records 170. The fields in an Action Index Entry are defined as follows:

| Flags | 0x80 indicates that the index entry is in use. Note that the "0x" prefix is hexadecimal notation. |
| --- | --- |
| | 0x40 indicates that the index entry has been updated and needs to be written to persistent storage. This is normally used when updating a Pattern Database 50 with the Create Pattern Database software 42. |
| Action size | The size of the associated action record. |
| Action file offset | The file relative address offset of the associated action record. |
| Action memory pointer | The memory address of the associated action record. |

Figure 18:
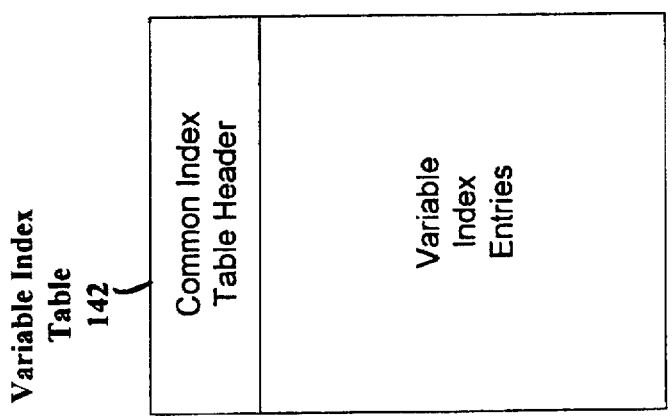
FIG. 18 shows the content of the Variable Index Table.

FIG. 18 shows the content of the Variable Index Table 142. The Variable Index Table is used to reference variables that are used in the response definitions that are associated with the patterns in the database. A Common Index Table Header 216 and Variable Index Entries are contained in the Variable Index Table. A Variable Index Entry is used to reference a variable record that contains the variable definition. When the Pattern Database is being used for message matching and automatically performing functions, a variable record (stored in memory and not in persistent storage) contains the present value of the variable.

Figure 19:
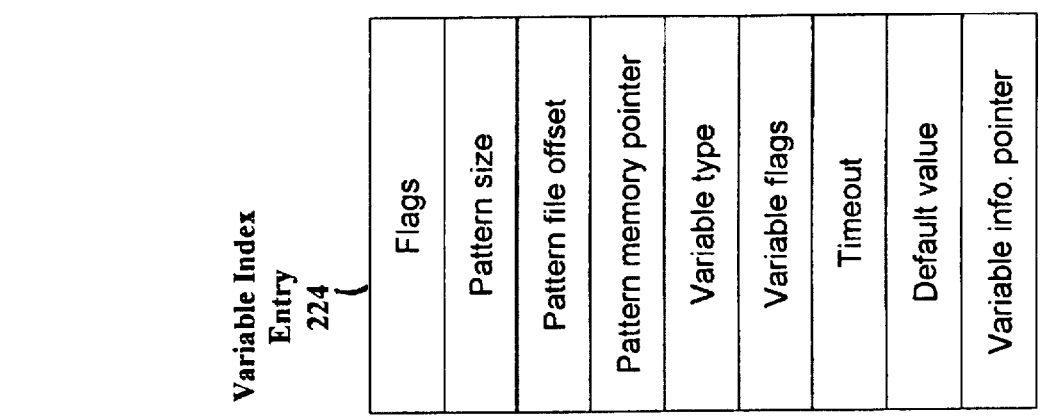
FIG. 19 illustrates the content of a Variable Index Entry.

FIG. 19 illustrates the content of a Variable Index Entry 224. The fields in a Variable Index Entry are defined as follows:

| Flags | 0x80 indicates that the index entry is in use. |
| --- | --- |
| | 0x40 indicates that the index entry has been updated. |
| Variable record size | The size of the referenced variable record. |
| Variable file offset | The file relative address offset of the referenced variable record. |
| Variable memory pointer | The memory address of the referenced variable record. |
| Variable type | The type of the variable, either string or integer. |
| Variable flags | 0x8000 - Group variable |
| | 0x4000 - Variable is retained |
| | 0x0001 - Time-out is specified in minutes |
| Time-out | The number of seconds to elapse before a variable is reset to its default value (0 indicates no time-out value) if it has not be referenced by either a SET or RESET function. Note that when a variable is involved in the evaluation of an expression, it is at that time that the Time-out is checked and the value reset if necessary. |
| Default value | The default value of an integer variable or a pointer to the default value of a string variable. |

| | |
|---|---|
| Variable info. pointer | A pointer to the variable information structure that is used to store run-time information about a variable. |

Figure 20:
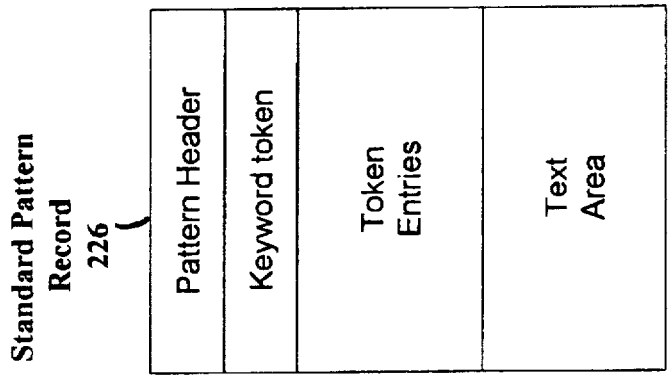
FIG. 20 shows the content of a Standard Pattern Record.

FIG. 20 shows the content of a Standard Pattern Record 226. A Standard Pattern Record is used for storing pattern definitions for a standard pattern. A Standard Pattern Record consists of a Pattern Header, a Keyword token, one or more Token Entries, and a Text Area.

The Pattern Header is used for managig the Pattern Record 226. The Keyword token is used to specify the keyword for the pattern definition. The Token Entries are used to define additional criteria for matching messages to the pattern definition.

FIG. 21 shows the content of a Non-standard Pattern Record 228. A Non-standard Pattern Record is used for storing pattern defrnitions for non-standard patterns and contains a Pattern Header and one or more Token Entries, similar to those of Standard Pattern Records.

FIG. 22 shows the content of a Pattern Header 230. A Pattern Header is included in each Standard and Non-standard Pattern Record to manage the respective records. The fields in the Pattern Header are defined as follows:

| | |
|---|---|
| Pattern-ID | A self identifier found in all records which contains a record type, sub-type, and index number. |
| Record size | The size of the record. |
| Total message tokens | The total number of tokens expected in the message. |
| Pattern token count | The number of tokens defined for the pattern. |
| Flags | 0x40 - The delimiters are a delimiter set. |
| | 0x10 - The pattern is of variable length. |
| | 0x08 - The pattern has a CONSTRAINT definition. |
| Delimiter offset | 0 for standard patterns, or the record relative offset to the delimiter list or delimiter set for non-standard patterns. |
| Action-ID | The record identifier of the associated actions which is an index into the Action Index Table 140. |

FIG. 23 shows the content of a Keyword and Fixed type Token Entries 232. The fields in Keyword and Fixed type Token Entries are defined as follows:

| | |
|---|---|
| Token type | 0 - Undefined |
| | 1 - Keyword |
| | 2 - Fixed |
| Token position | The message relative token position. |
| Token key code | The value for quick matching which is calculated from the token text. It is used for quick comparisons so that a character by character compare is performed only if the token key codes are the same. |
| Token offset | The record relative offset to the NULL terminated token text in the text area of the Pattern Record 226 or 228. |

FIG. 24 shows the content of a Masked Token Entry 234. The fields in a Masked Token Entry are defined as follows:

| | |
|---|---|
| Token type | 0 - Undefined |
| | 3 - Masked |
| Token position | The message relative token position. |
| Minimum bytes | The minimum number of bytes required to match mask. If the number of bytes in the message token is less than the minimum required by the mask, the message token cannot match the mask. |

-continued

| | |
|---|---|
| Maximum bytes | The maximum number of bytes required to match mask. If the number of bytes in the message token is greater than the maximum bytes required by the mask, the message token cannot match the mask. |
| Token offset | The record relative offset to the NULL terminated token text in the text area of the Pattern Record 226 or 228. |

FIG. 25 shows the content of a Constraint Token Entry 236. Each of the fields in the Constraint Token Entry are defined as follows:

| | |
|---|---|
| Expression type | 0 - Undefined |
| | 6 - Constrained |
| Expression length | The length of the expression. |
| Expression offset | The record relative offset to the internal, post-fix Function decision used as the constraint. |

FIG. 26 shows the content of an Action Record 238. An Action Record is used to store a response definition for an associated pattern definition. An Action Record consists of an Action Header and one or more Action Entries and Action Sub-entries. The Action Header is used to manage the Action Record, and the Action Entries and Action Sub-entries are used to define the functions to perform.

FIG. 27 shows the content of an Action Header 240. The fields in an Action Header are defined as follows:

| | |
|---|---|
| Action Identifier | The index into the Action Index Table of the Action Index Entry. |
| Record size | The size of the Action Record. |
| Action count | The number of actions (Action Entries) defined in the Action Record. |
| Total action/ sub-action count | The total number of Action Entries and Sub-entries defined. |

FIG. 28 shows the content of an Action Entry 242. The fields in an Action Entry are defined as follows:

| | | |
|---|---|---|
| Modes | 0x40 - The action contains substitution sequences. | |
| | 0x20 - The Action offset is not an offset. | |
| | 0x08 - More information follows in an Action Sub-entry. Sub-entries contain supplemental information that is associated with the preceding Action Entry. | |
| Action type | "A" | alarm |
| | "C" | command |
| | "E" | activate another database |
| | "R" | read-and-reply response |
| | "U" | deactivate the database |
| | "T" | transparent command |
| | "V" | event-report |
| | "E" | display |
| | "H" | highlight |
| | "K" | hold |
| | "L" | release |
| | "S" | suppress |
| | "M" | create member |
| | "F" | destroy member |
| | "?" | IF statement |
| | "$" | ELSEIF statement |
| | ":" | ELSE statement |
| | "." | ENDIF statement |
| | "#" | reset to default value |
| | "=" | assign value to variable |
| Action offset | The record relative offset to a NULL terminated action text. | |

| For Type: | Text is: |
|---|---|
| "?" | IF expression (in post-fix notation) to be evaluated |
| "$" | ELSEIF expression (in post-fix notation) to be evaluated |
| ":" | None, the Action Offset is replaced by the index to the ENDIF for the block level (nesting level) of the corresponding IF statement |
| "." | None |
| "#" | Variable reference to reset |
| "=" | Assignment expression to be evaluated |

FIG. 29 shows the content of an Action Sub-entry 244. The fields in an Action Sub-entry are defined as follows:

| | |
|---|---|
| Flags | 0x20 - Sub-entry data is not an offset |
| | 0x08 - More information follows in a subsequent sub-entry |
| Sub-entry type | 1 - Wait clause |
| | 2 - Indicates that the sub-entry data is an index to the next ELSEIF, ELSE, or ENDIF statement for the corresponding IF block level |
| Sub-entry data | - Number of seconds to wait before performing action |
| | - Index to the next ELSEIF, ELSE, or ENDIF statement for the corresponding IF block level |

Expressions may be found in the CONSTRAINT, IF, ELSEIF, and SET commands. Thus expressions may be stored in the text area of Standard Pattern Records 226 and Non-Standard Pattern Records 228 as well as in the text area of Action Records 238.

An expression is a series of operands and operators that compute a value. Conceptually, expressions are stored in the Pattern Database 50 as operands and operators in post-fix notation. However, each operand is stored with a one-byte, binary operand-code followed by type specific "encoded or packed" operand data. Operators are stored as a one-byte, binary operator code. The expressions are always NULL terminated.

Operands are stored in the Pattern Database 50 as one-byte, binary operand type specific data. Operand codes are defined as:

| Value | Description |
|---|---|
| 128 | Integer |
| 129 | String with no embedded substitution |
| 130 | String with embedded substitution |
| 131 | Variable name target of assignment |
| 132 | Reference to the value of a variable |
| 133 | Reference to the value of a reserved variable |
| 134 | Escape sequence reference to a variable |

Integers are always stored as a positive value. Negative number are stored as a positive interger followed by an unary negation operator.

Strings (both with and without embedded substitution) and escape sequences are stored in the expression as NULL terminated strings. Escape sequences are stored with a leading and trailing escape character (\), but strings do not include the leading and trailing quote character (").

Variable references are stored with the operand code, followed by a variable type designator (string or integer), followed by an index reference to the variable.

Operators are stored as a single binary byte value in the expression. The particular values used for the operator codes could be selected by one of ordinary skill in the art.

FIG. 30 shows the content of a Variable Record 246. A Variable Record is used for a data definition of a variable in the Pattern Database. At run-time, a variable information structure is set up to manage information for a variable. The fields in a Variable Record are defined as follows:

| | |
|---|---|
| Variable-ID | The index into the Variable Index Table. |
| Record size | The size of the Variable Record. |
| Variable type | 1 - Integer |
| | 2 - Character string |
| Flags | 0x8000 - Group variable |
| | 0x4000 - Variable is retained |
| | 0x2000 - Run-time only flag that indicates whether the structure is a variable group member |
| | 0x0001 - Time-out originally specified in minutes |
| Time-out | The number of seconds to elapse before a variable is reset to its default value. |
| Name offset | The record relative offset to the NULL terminated name of the variable |
| Default value | The default value of an integer variable or a record relative offset to the NULL terminated default value of a character string value. |
| Text Area | The storage space in the Variable Record in which the name and default value of a variable is stored. |

FIG. 31 shows the content of a Variable Information Structure 248. The Variable Information Structure is used to store information pertaining to a variable when a Pattern Database 44 is opened for message matching. The variable information structure is created the first time a variable is referenced when the databa se has been opened for pattern matching. The pointer to the run-time variable information structure is maintained within the respective Variable Index Entry.

The Variable Information Structure is used for a variety of purposes. It is used to contain the current value of a single variable, the basic information and pointer to the member list for group variables, the current name and value of each member of a group variable, and as the memory for retained variables. The fields in the Variable Information Structure are defined as follows:

| | |
|---|---|
| Link | A pointer to the next Variable Information Structure in a linked list. This field is only used to maintain group variables. |
| Name Code | Hash code value of the variable name. |
| Variable Type | 1 = integer variable |
| | 2 = string variable |
| Flags | 0x8000 - Group variable |
| | 0x4000 - Variable is retained |
| | 0x0001 - Time-out originally specified in minutes |
| Variable Name Pointer | A pointer to the name of the variable. The name is either the defined name of the variable or the dynamic name of a group variable member depending on the use of the structure. |
| Last Update Time | A time stamp of the time of the last reference to the variable that changed the variable's value. The last update time is zero before the variable is set the first time or whenever it is reset to the default value. |
| Current Value | The current value is defined as a union of three different types: a generic pointer for general use, a long integer for integer types, or a structure to maintain the string value of a string type. The use of the Current Value field depends on how the structure is being used. |

Figure 32:
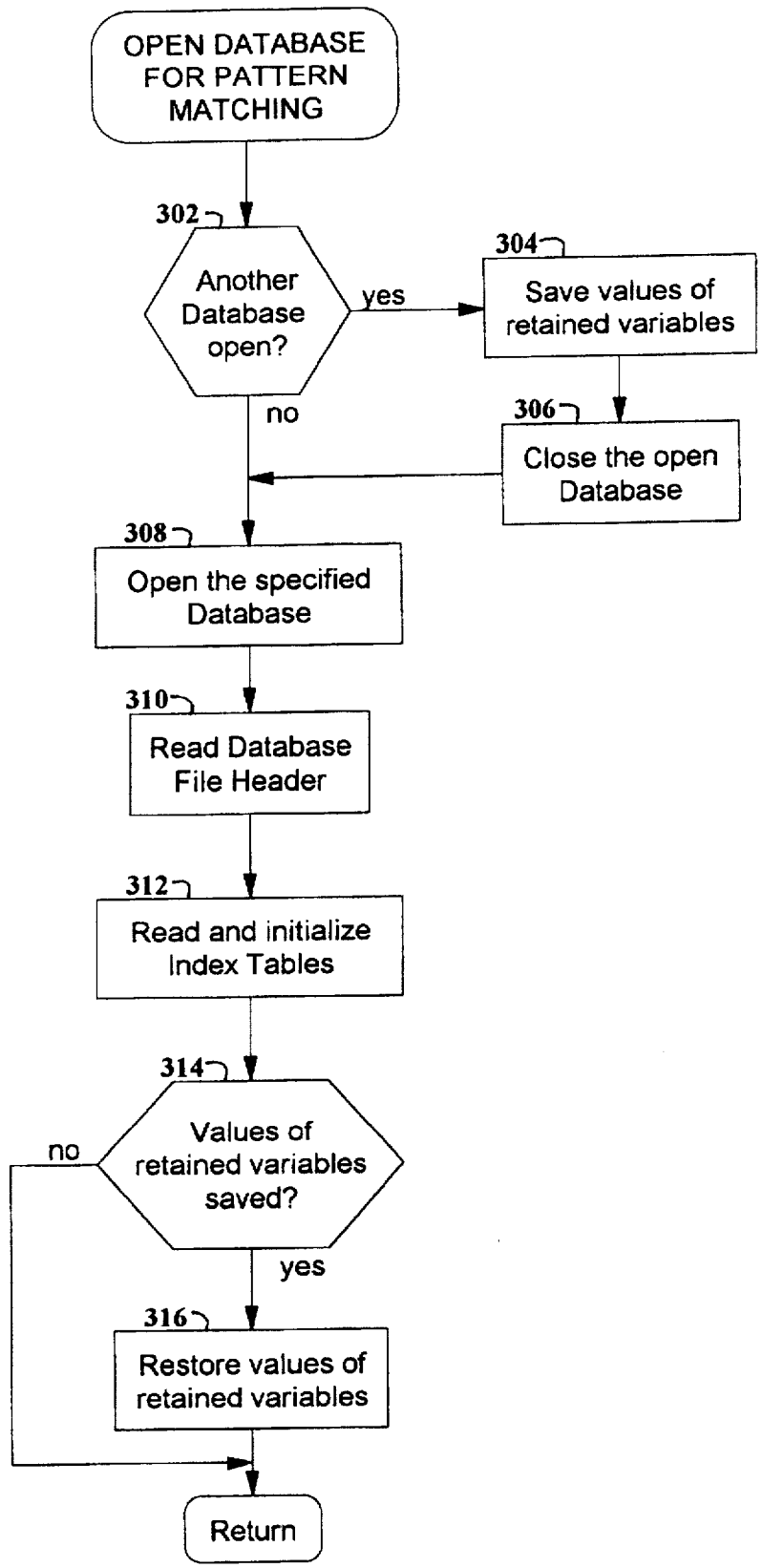
FIG. 32 is a flowchart of the processing for opening the Pattern Database for the purpose of matching input messages against the pattern definitions.

FIG. 32 is a flowchart of the processing for opening the Pattern Database 44 for the purpose of matching input messages against the pattern definitions.

Decision Step 302 tests whether another database is already open. If so, the values of variables that are defined as retained for the presently open database are saved. The values of the retained variables defined in the Pattern Database 50 previously used are carried forward for use in a newly activated Pattern Database if the variables are also defined in the newly activated Pattern Database. In the exemplary embodiment, the values of variables are not saved in persistent storage. Therefore, the retained values will not be retained if Message Processor 50 ceases operation.

Step 306 closes the presently open database and control is then directed to Step 308. Step 308 opens the specified Pattern Database 44. The File Header 132 is read at Step 310 and the respective Index Tables 134, 136, 138, 140, and 142 are read from persistent storage into memory and initialized at Step 312.

Step 314 tests whether any of the variables defined in the Pattern Database 44 are defined as having retained values. If so, the values of the retained variables are restored at Step 316. Control is then returned to the processing that initiated the opening of the database.

Figure 33A:
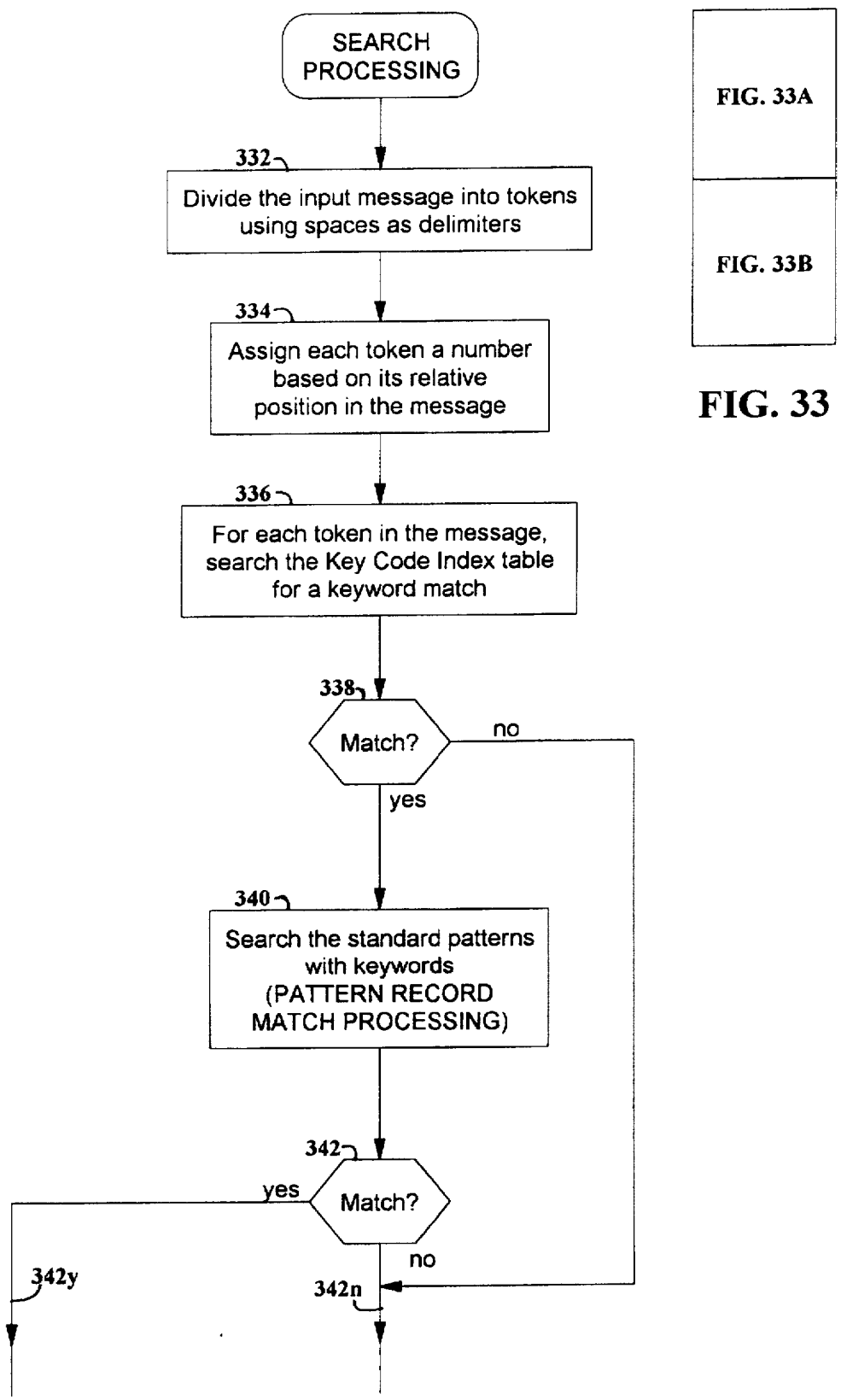
FIGS. 33A and 33B contain a flowchart of the processing for searching the Pattern Database for a pattern that matches an input message.
Figure 33B:
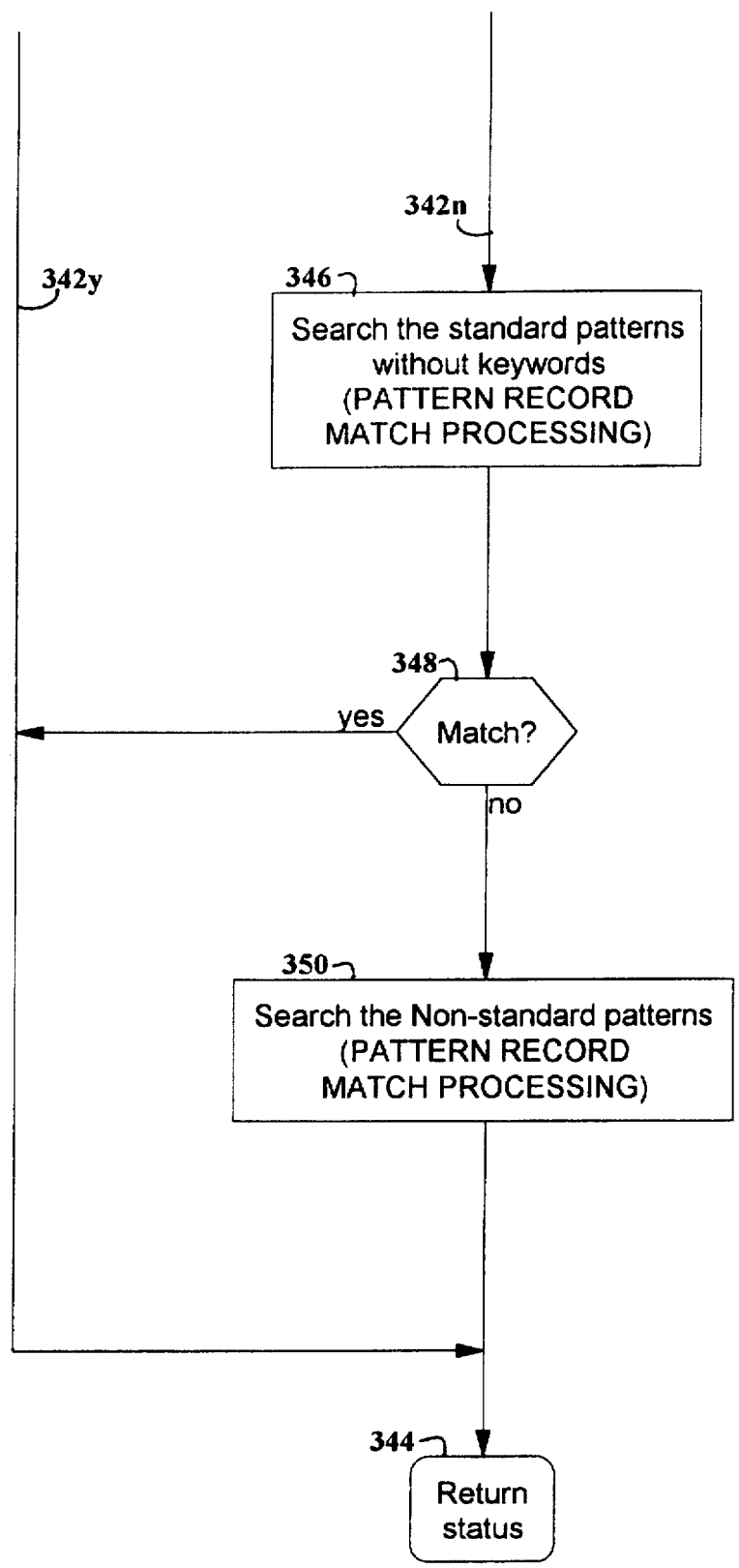

FIG. 33 shows the relationship between FIGS. 33A and 33B. FIGS. 33A and 33B contain a flowchart of the processing for searching the Pattern Database 44 for a pattern that matches an input message.

Step 332 divides the input message into one or more tokens using the space character (i.e., " ") as a delimiter. At Step 334, each token is assigned a token number based on its relative position within the message. Token number one is the first token in the message, token number two is the second token in the message, etc. At Step 336, the Key Code Index Table 134 is searched for Key Code Index Entries 218 that match any of the tokens from Steps 332 and 334 using the Key Position, Key Length, and Key Code fields from the Key Code Index Entries. The length of the message token associated with the key position is compared to the key length. If they are equal, a key code value is calculated for the message token and compared to the key code in the Key Code Index Table. If they are equal, the message token may match the keyword and further comparison using the information in the Pattern Record is required.

Figure 34:
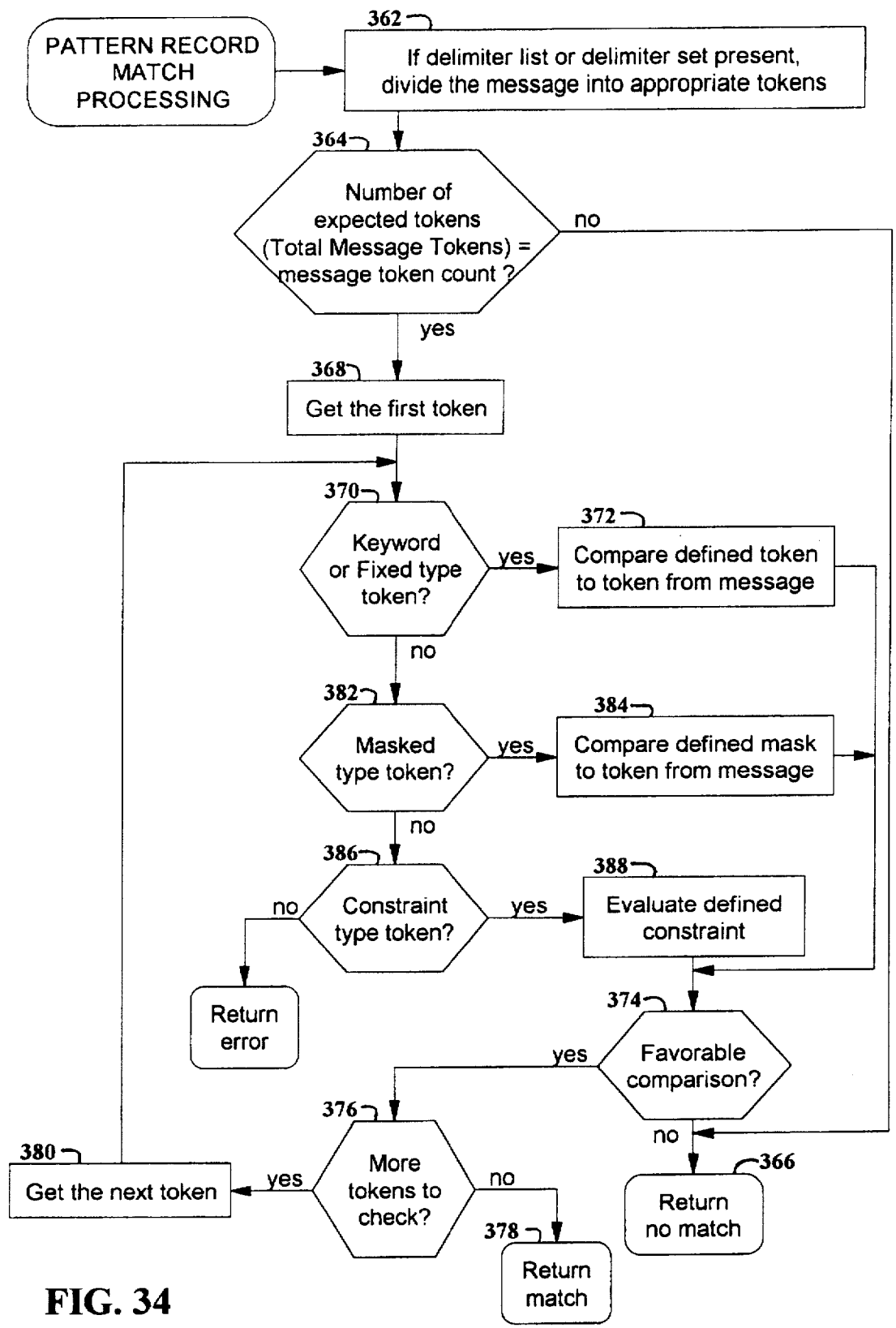
FIG. 34 is a flowchart of Pattern Record Match Processing.

If any matches are found, decision Step 338 directs control to Step 340. Step 340 searches for a matching pattern definition in the Standard Pattern Records 158 that are associated with the Key Code Index Entries from Step 336. FIG. 34 describes the Pattern Record Match Processing. If a matching pattern definition is identified at Step 340, decision Step 342 directs control to Step 344 via control Path 342y to return a match status. Otherwise, control is directed to Step 346 via control Path 342n.

Step 346 searches for a matching pattern definition in the Standard Pattern Records 158 that do not have keywords defined. Again, the Pattern Match Record Processing of FIG. 34 describes the pattern matching. If a matching pattern definition is found at Step 346, decision Step 348 directs control to Step 344 to return an appropriate status. Otherwise, control is directed to Step 350 to search the Nonstandard Pattern Records 164.

Step 350 searches the Non-standard Pattern Records 164 according to the Pattern Record Match Processing of FIG. 34. Control and search status information is returned at Step 344.

FIG. 34 is a flowchart of Pattern Record Match Processing. This processing is performed in matching an input message to the pattern definitions in Standard Pattern Records 158 and Non-standard Pattern Records 164.

If the Pattern Header 230 indicates that there is either a delimiter set or delimiter list in the Pattern Record, at Step 362 the token is divided into tokens according to the specified delimiters. Step 364 tests whether the number of expected tokens (the Total Message Tokens from the Pattern Header 230) is equal to the number of tokens in the input message. If not, control is directed to Step 364 where a status is returned to indicate that the pattern definition of the Pattern Record did not match the input message. Otherwise, decision Step 362 direct control to Step 366.

Step 368 gets the first token (Token Entry 232, 234, or 236 and token text) from the pattern definition. If the token type is either keyword or fixed, decision Step 370 directs control to Step 372. Step 372 compares the defined token to the token from the message and directs control to decision Step 374. If the keyword or fixed type token does not match the token from the input message, control is directed to Step 366 as described above. Otherwise, if the comparison is favorable, control is directed to decision Step 376.

Decision Step 376 tests whether there are more Token Entries 232, 234, or 236 in the Pattern Record 226 or 228. If all the Token Entries have been processed, control is directed to Step 378 where a status is returned to indicate that a matching pattern definition was identified. Otherwise, control is directed to Step 380 to get the next Token Entry in the Pattern Record. Control is directed to Step 370 as described above.

For tokens whose type is neither fixed nor keyword, control is directed to Step 382. If the token type is masked, decision Step 382 directs control to Step 384. Step 384 compares the defined mask to the corresponding token from the input message and directs control to Step 374 as described above. Control is directed to decision Step 386 if the token type is not of type masked.

Decision Step 386 tests whether the token type is of type constraint. If not, an error condition is returned. Otherwise, control is directed to Step 388 where the defined constraint expression is evaluated. Control is then directed to Step 374 as described above.

Figure 35B:
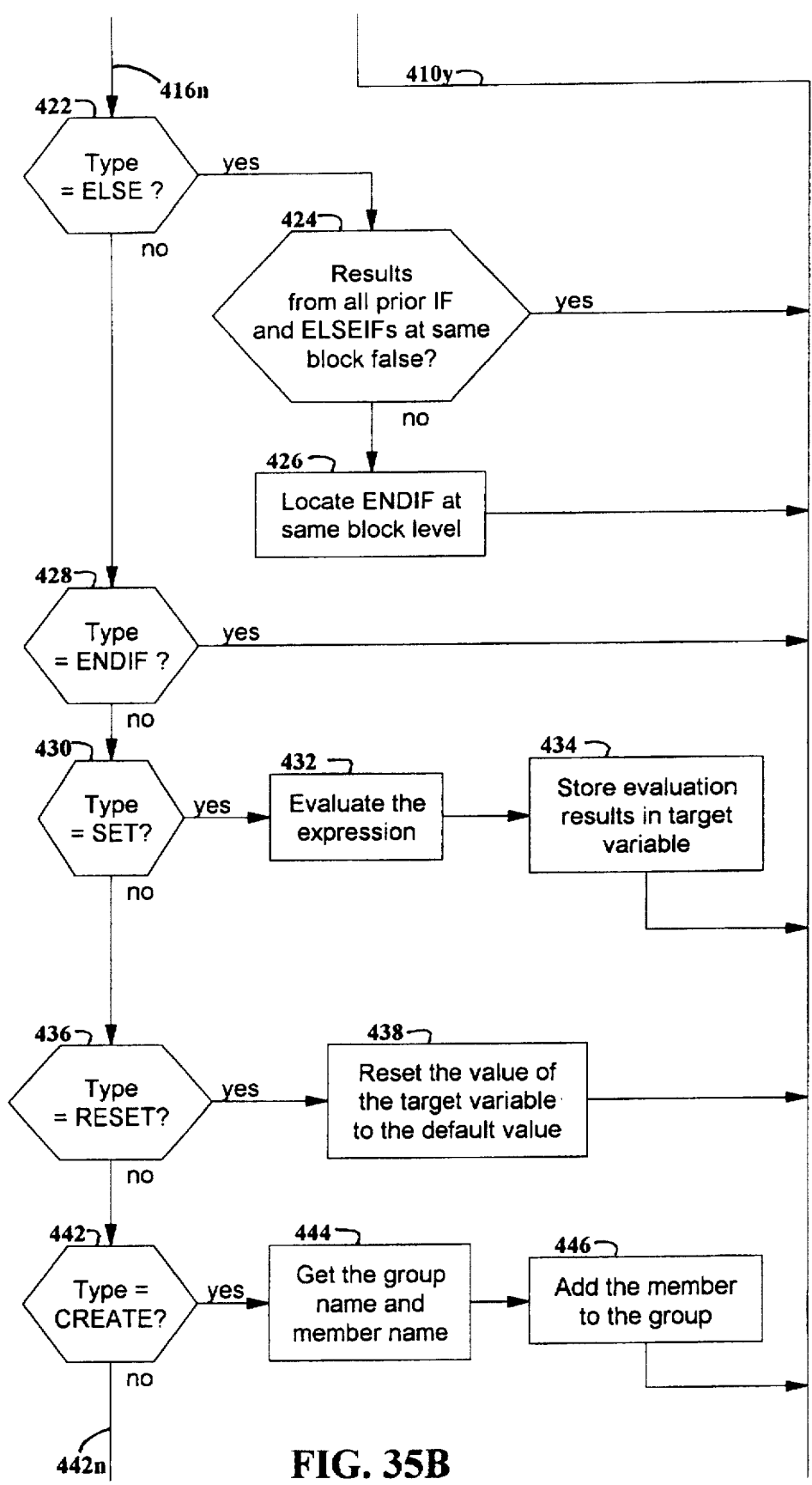
Figure 35C:
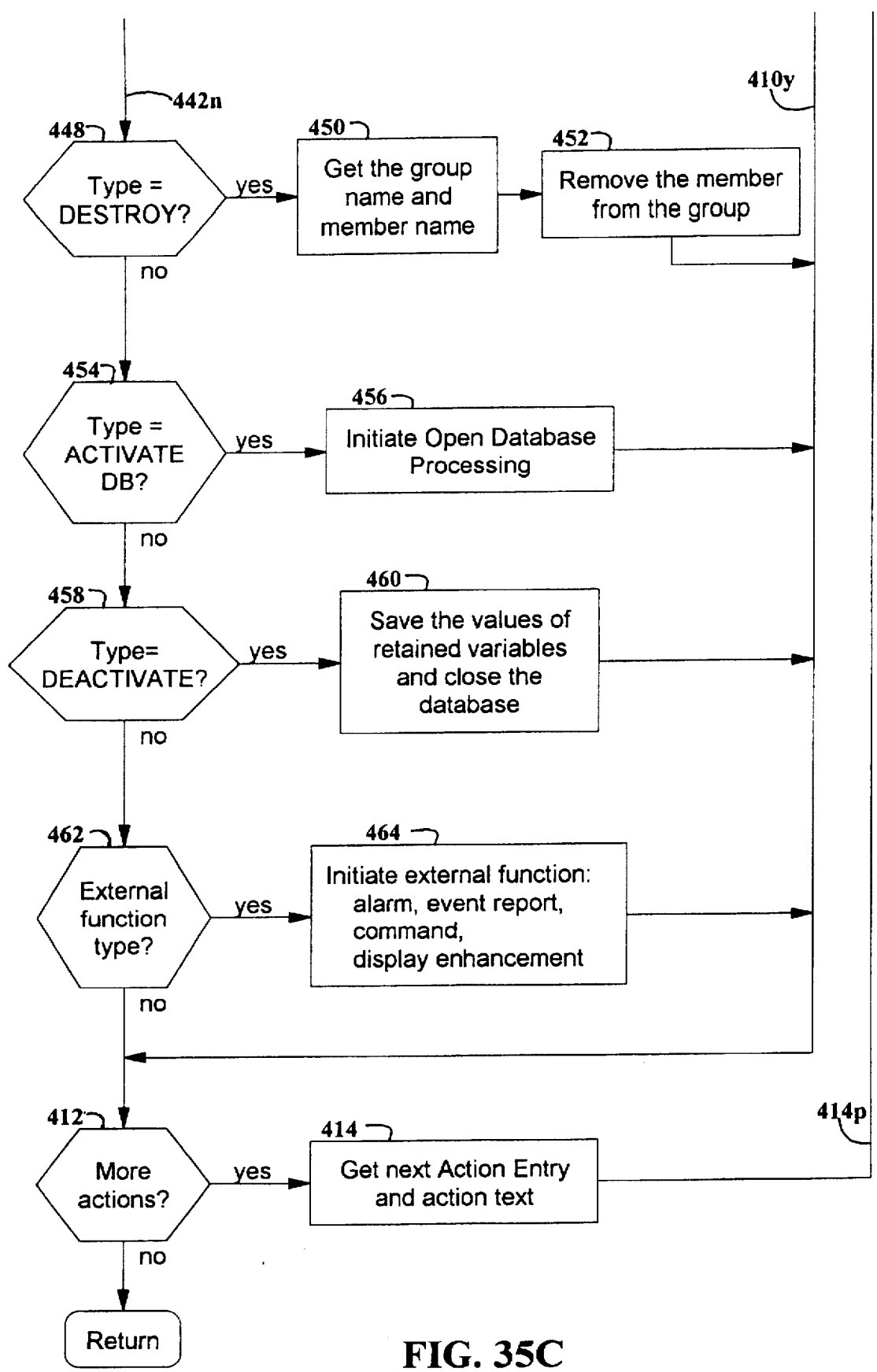

FIG. 35 shows the relationship between FIGS. 35A, 35B, and 35C which contain a flowchart of the Response Interpretation Processing. The Response Interpretation Processing interprets the response definition that is associated with a pattern definition which matched an input message. The response definition is stored in an Action Record 238.

Step 402 gets the Action Record 238 that is associated with a matching pattern definition. The Action-ID field in the Pattern Header 230 is used for referencing an Action Index Entry 222 in the Action Index Table 140. Step 404 gets the first Action Entry 242 from the Action Record.

If the Action Type specified in the Action Entry 242 is an IF statement, decision Step 406 directs control to Step 408. Step 408 evaluates the expression that is associated with the IF statement and which is set forth (in post-fix notation) in the text portion of the Action Record 238. If the results of the IF expression evaluate to true, control is directed via control Path 410y to decision Step 412. If the are more Action Entries 242 in the Action Record 238 to process, control is directed to Step 414. Otherwise control is returned (See FIG. 3). Step 414 directs control to decision Step 406 via control Path 414p after the next Action Entry is obtained.

If the result of evaluating the expression from Step 408 is false, decision Step 410 directs control to Step 415. Step 415 locates the next ELSE-IF statement, or the next ELSE or ENDIF statement that is at the same block level (nesting level) as the IF statement, skipping intervening Action Entries 242 and Action Sub-entries 244. Recall that the Action Sub-entry 244 is used to reference the next ELSEIF, ELSE, or ENDIF statement that correspond to the block level of the IF statement. Control is then directed to Step 412 via control Path 410y as described above.

Decision Step 406 directs control to decision Step 416 if the Action Type is not an IF statement. If the action type is an ELSE-IF statement, decision Step 416 directs control to Step 418, where the results of all the previous evaluations of expressions for IF and ELSE-IF statements at the same block level are checked. If all the prior results are false (i.e., evaluation of the present ELSE-IF has not been precluded), then control is directed to Step 408 to evaluate the expression associated with the present ELSE-IF statement as described above.

If the expressions of any of the prior IF or ELSE-IF statements at the same block level evaluated to true, interpretation of the present ELSE-IF statement is precluded and decision Step 418 directs control to Step 420. Step 420 locates the ENDIF statement at the block level of the IF statement and directs control to Step 412 as described above.

Decision Step 422 tests for an ELSE statement. If an ELSE statement is encountered, control is directed to decision Step 424 to test the results of the associated IF and ELSEIF statements. If none of IF and ELSEIF statements at the same block level evaluated to true, control is directed to Step 412 as described above. Otherwise, control is directed to Step 426. Step 426 locates the ENDIF that corresponds to the block level of the IF statement.

If an ENDIF statement is found, decision Step 428 simply directs control to Step 412 as described above. Otherwise, control is directed to Step 430.

Decision Step 430 tests for a SET statement. Control is directed to Step 432 if a SET statement is encountered. Step 432 evaluates the expression of the set statement and Step 434 stores the computed value in the Variable Information Structure 248 of the target variable. The Last Update Time field in the Variable Information Structure is also updated.

If the statement type is RESET, decision Step 436 directs control to Step 438 where the Current Value field in the Variable Information Structure is reset to the Default value from the Variable Record 246. In addition, the Last Update Time field in the Variable Information Structure is updated. Control is directed to Step 412 via control Path 410y.

For a CREATE type statement, decision Step 442 directs control to Step 444. Step 444 obtains the group name and member name from the text area of the Action Record 238. Then at Step 446, the new member is added to the specified group by creating a new Variable Information Structure 248 and linking it to the list of Variable Information Structures for the specified group. Processing continues at Step 412 as described above. Decision Step 448 directs control to Step 450 when a DESTROY statement is encountered. Step 450 obtains the group name and member name from the text area of the Action Record 238. Step 452 removes the identified member from the specified group by removing the associated Variable Information Structure from the list for the specified group. Control is then directed to Step 412.

If the statement type is ACTIVATE DATABASE, decision Step 454 directs control to Step 456. Step 456 initiates the Open Database Processing of FIG. 32 and then directs control to Step 412 as described above.

For a DEACTIVATE DATABASE statement, decision Step 458 directs control to Step 460 where the values of any retained variables are saved for later reference. The Pattern Database 44 is then closed and control is directed to Step 412.

Decision Step 462 tests for an external type function. The external type functions are those in which the processing of the function is performed by an agent that is external to the Message Processor. Example external agents include the Host 10 operating system, the display control for the Console 12, power control units, and monitoring software running on machines other than the Console 12. The external functions of the exemplary system include alarms, event reports, messages, commands, and display enhancement functions. The output from the Message Processor varies according to the type of response that the external agent expects from the Message Processor. The output could be a function code, an integer, or a character based message that is of free format or a predetermined syntax. Step 464 initiates the external function by making the output message or code available to the proper agent. Control is then directed to Step 412 as described above.

While the invention has been described in the context of an Automated Operation Console 12 coupled to a Host data processing system 10, those skilled in the art will recognize that the various concepts and features claimed below are not limited to the exemplary embodiment. The features of the invention would be suitable for any application that requires the capabilities of message matching and automated responses.

We claim:

1. In a data processing system having a message processor for receiving message character strings and automatically performing predetermined functions according to the message character strings received, a method for creating a pattern database on a computer readable medium from a user specified data input stream that includes pattern definitions and response definitions, the pattern database for matching ones of the pattern definitions to ones of the response definitions, comprising the steps of:

reading the pattern definitions from the data input stream, wherein each of the pattern definitions is specified to match an associated one of the message character strings;

reading the response definitions from the data input stream, wherein each of the response definitions comprises one or more function definitions, wherein each of the response definitions further comprises one or more function decisions associated with specified ones of the function definitions, and wherein each of the response definitions further comprises one or more data structure definitions associated with specified ones of the function definitions and function decisions;

storing in the computer readable medium the pattern definitions and the response definitions, wherein said storing step comprises the steps (a) through (d);

(a) associating each of the pattern definitions with an associated one of the response definitions, the associated one of the response definitions defining the response to the associated message character string;

(b) recording in the computer readable medium that each of the pattern definitions are associated with one of the response definitions:

(c) recording in the computer readable medium that each of the function decisions are associated with specified ones of the finction definitions; and (d) recording in the computer readable medium that each of the data structure definitions are associated with specified ones of the function decisions and function definitions.

2. The method of claim 1, wherein predetermined ones of the data structure definitions include time-out values and default values, and said storing step further comprises the step of associating the time-out values and default values with specified ones of the data structure definitions.

3. The method of claim 1, wherein said storing step further comprises the steps of storing each of the pattern definitions in an associated pattern record in a pattern database; and storing each of the response definitions in an associated action record in said pattern database; and said associating step (a) further comprises the step of establishing references in each of said pattern records to an associated one of said action records.

4. The method of claim 3, wherein said recording step (c further comprises the step of storing the function decisions and associated ones of the function definitions in associated ones of said action records.

5. In a data processing system having a message processor for receiving messages and automatically performing predetermined functions according to the message received, an article of manufacture for instructing a computer to create a pattern database on a computer-readable storage medium from a user specified data input stream the pattern database for matching messages, and in response thereto, executing predetermined response definitions, the article of manufacture comprising:

read means for instructing a computer to read pattern definitions from the data input stream and to read the response definitions from the data input stream, wherein each of said pattern definitions is specified to match a received message, and each of the response definitions comprises one or more function definitions, one or more function decisions associated with specified ones of said function definitions, and one or more data structure definitions associated with specified ones of said function definitions and said function decisions;

store means coupled to said read means for instructing the computer to store in the computer-readable storage medium said pattern definitions and the response definitions, wherein said store means comprises association means for instructing the computer to associate each of said pattern definitions with a specified one of the response definitions, to associate said function decisions with specified ones of said function definitions, and to associate said data structure definitions with specified ones of said function decisions and said function definitions.

6. In a data processing system having a message processor for receiving message character strings and automatically performing predetermined function definitions according to the message character strings received, wherein a predefined pattern database contains pattern definitions specified to identify one or more of the received message character strings and response definitions associated with the pattern definitions, wherein each of the response definitions is associated with at least one of the pattern definitions and includes one or more function definitions and further includes function decisions and data structure definitions associated with specified ones of the function definitions, a method for processing a received message character strings comprising the steps of:

searching the pattern database for a pattern definition that matches the received message character string;

if the received message character string matches a matching pattern definition in said searching step, performing steps (a) through (c);

(a) obtaining a predetermined set of the function decisions, data structure definitions, and function definitions associated with the matching pattern definition;

(b) interpreting the function decisions to determine which of the predetermined set of function definitions to initiate; and (c) conditioning initiation of the predetermined set of function definitions upon interpretation of the function decisions.

7. The method of claim 6, wherein one or more of the data structure definitions include time-out values and default values, and the method further comprises the step of automatically setting the value of a data structure to an associated one of said default values after expiration of a period of time specified by an associated one of said time-out values.

8. The method of claim 7, wherein said setting step is performed only if the value of a data structure having a time-out value has not been updated within a period of time that exceeds the time-out value.

9. The method of claim 6, wherein selected ones of the function definitions include a wait value, and said performing step comprises the step of waiting for a period of time specified by a wait value associated with one of said selected ones of the function definitions before initiating performance of said one of said selected ones of the function definitions.

10. The method of claim 6, further comprising the step of saving the value of a data structure, whereby said value is available after a pattern database is closed and subsequently re-opened.

11. The method of claim 6, wherein said function decisions include if-statements and each of the if-statements includes a function decision, wherein said interpreting step comprises the step of evaluating said function decision; and initiation of the function definitions in said conditioning step being dependent upon a result of said evaluating step.

12. The method of claim 11, wherein said function decisions include elseifstatements and each of the elseif-statements includes a function decision, and further comprising the step of evaluating a function decision of an elseif-statement that corresponds to said if-statement if evaluating a function decision of said corresponding if-statement is false.

13. The method of claim 12, wherein said function decisions include else-statements, and further comprising the step of executing a function definition associated with said else-statement if a result of evaluating a function decision of an elseif-statement that corresponds to said else-statement is false.

14. In a data processing system having a message processor for receiving and processing message character strings, wherein a predefined pattern database contains pattern definitions which identifyr one or more of the received message character strings and response definitions associated with the pattern definitions, wherein each of the response definitions is associated with at least one of the pattern definitions and includes one or more function definitions, the predefined pattern database further containing function decisions associated with predetermined ones of the function definitions, and one or more data structure definitions associated with the function decisions, an article of manufacture for instructing the data processing system to process a received message character string, comprising:

search means for instructing the data processing system to search the pattern database for a matching pattern definition that matches the received message character strng;

read means coupled to said search means for instructing the data processing system to read a predetermined one of the response definitions associated with said matching pattern definition, said predetermined one of the response definitions specifying a predetermined set of function decisions, data structure definitions, and function definitions associated with said matching pattern definition;

interpretation means coupled to said read means for instructing the data processing system to interpret said predetermined set of function decisions to determine which of said predetermined set of functions definitions are selected functions definitions; and initiation means coupled to said interpretation means for instructing the data processing system to initiate execution of said selected function definitions as dictated by interpretation of said predetermined set of function decisions.

15. In a data processing system having computer readable storage and a message processor for receiving and processing input messages, an apparatus for automatically responding to the messages, comprising:

establishment means for establishing in the computer readable storage a plurality of pattern definitions to match one or more of the messages and for establishing in the computer readable storage a plurality of responses to the messages;

association means coupled to said establishment means for associating in the computer readable storage a predetermined one of said responses with each of said pattern definitions;

detection means for detecting a sequence of messages that matches a matching one of said pattern definitions;

response means coupled to said detection means for automatically and variably responding to said sequence of messages by executing a predetermined one of said responses associated with said matching one of said pattern definitions.

16. The apparatus of claim 15, wherein messages that comprise said sequence of messages contain the same data.

17. The apparatus of claim 15, wherein messages that comprise said sequence of messages contain varying data.

18. The apparatus of claim 15, further comprising wait means coupled to said response means for waiting for a predetermined period of time before responding.

19. The apparatus of claim 15, further comprising:

save means for saving in the computer readable storage a portion of an input message that matches a pattern definition; and wherein said response means further comprises means for variably responding according to a saved portion of an input message.

20. The apparatus of claim 15, further comprising:

save means for saving in the computer readable storage a portion of a first input message; and wherein said response means further comprises means for variably responding to a second input message based on a saved portion of said first input message.

21. In a data processing system having computer readable storage and a message processor for receiving and processing input message character strings, a computer implemented method for automatically responding to the input message character strings, comprising:

establishing in the computer readable storage a plurality of pattern definitions to match one or more of the input message character strings;

establishing in the computer readable storage a plurality of responses;

associating each of said pattern definitions in the computer readable storage with a predetermined one of said responses;

establishing function decisions that condition predetermined ones of said responses;

receiving one of the input message character strings;

identifying a matching pattern definition that matches said one of the input message character strings from said receiving step; and conditionally responding to said one of the input message character strings from said identifying step according to evaluation of a function decision that conditions a response associated with said matching pattern definition.

22. In a data processing system having a message processor for receiving messages and automatically performing predetermined functions according to the message received and a database creation processor for creating a pattern database from a user specified data input stream that includes one or more pattern definitions and one or more response definitions, wherein each of the response definitions is associated with at least one of the pattern definitions and includes one or more definitions of ones of the predetermined functions, predetermined ones of the response definitions further including function decisions associated with predetermined ones of the functions, and other predetermined ones of the response definitions further including one or more data structure definitions associated with the function decisions, a method of operating the message processing system, comprising the steps of:

reading the pattern definitions from the data input stream;

reading the response definitions from the data input stream;

storing in a computer readable medium said pattern definitions and the response definitions, wherein said storing step comprises the steps (a) through (c);

(a) associating each of the pattern definitions with a predetermined one of the response definitions;

(b) associating the function decisions with specified ones of the functions;

(c) associating the data structure definitions with specified ones of the function decisions and functions; opening the pattern database for pattern matching; receiving a message; searching the pattern database for a pattern definition that matches the message; if the message matches a pattern definition, performing steps (d) through (f);

(d) obtaining the function decisions, data structure definitions, and functions associated with a matching pattern definition;

(e) interpreting the function decisions to determine which functions to initiate; and (f) performing the functions as dictated by interpretation of the function decisions.

* * * * *